(12) United States Patent
Banda et al.

(10) Patent No.: US 12,516,040 B2
(45) Date of Patent: Jan. 6, 2026

(54) CRYSTALLINE FORMS OF 7-CHLORO-2-(4-3-METHOXYAZETIDIN-1-YL)CYCLOHEXYL)-2,4-DIMETHYL-N-((6-METHYL-4-(METHYLTHIO)-2-OXO-1,2-DIHYDROPYRIDIN-3-YL)METHYL)BENZO[D][1,3]DIOXOLE-5-CARBOXAMIDE

(71) Applicant: Constellation Pharmaceuticals, Inc., Boston, MA (US)

(72) Inventors: Alamelu Banda, Winchester, MA (US); Victor S. Gehling, Somerville, MA (US)

(73) Assignee: Constellation Pharmaceuticals, Inc., Boston, MA (US)

( * ) Notice: Subject to any disclaimer, the term of this patent is extended or adjusted under 35 U.S.C. 154(b) by 956 days.

(21) Appl. No.: 17/628,947

(22) PCT Filed: Jul. 23, 2020

(86) PCT No.: PCT/US2020/043178
§ 371 (c)(1),
(2) Date: Jan. 21, 2022

(87) PCT Pub. No.: WO2021/016414
PCT Pub. Date: Jan. 28, 2021

(65) Prior Publication Data
US 2022/0251073 A1   Aug. 11, 2022

Related U.S. Application Data

(60) Provisional application No. 62/878,012, filed on Jul. 24, 2019.

(51) Int. Cl.
*C07D 405/14*    (2006.01)

(52) U.S. Cl.
CPC ........ *C07D 405/14* (2013.01); *C07B 2200/13* (2013.01)

(58) Field of Classification Search
None
See application file for complete search history.

(56) References Cited

U.S. PATENT DOCUMENTS

| | | | |
|---|---|---|---|
| 5,221,599 A | 6/1993 | Katoh et al. | |
| 5,296,497 A | 3/1994 | Hartog et al. | |
| 5,385,917 A | 1/1995 | Ueno et al. | |
| 5,514,505 A | 5/1996 | Limburg et al. | |
| 5,626,791 A | 5/1997 | Fenkl et al. | |
| 5,629,200 A | 5/1997 | Furukawa et al. | |
| 6,051,575 A | 4/2000 | Blythin et al. | |
| 10,017,500 B2* | 7/2018 | Kanno | A61P 43/00 |
| 10,689,371 B2* | 6/2020 | Côté | C07D 405/14 |
| 11,274,095 B2* | 3/2022 | Côté | C07D 405/12 |
| 11,919,912 B2* | 3/2024 | Côté | C07D 491/056 |
| 2004/0092520 A1 | 5/2004 | Griffith | |
| 2004/0092740 A1 | 5/2004 | Dumas et al. | |
| 2005/0245529 A1 | 11/2005 | Stenkamp et al. | |
| 2008/0194803 A1 | 8/2008 | Sinclair et al. | |
| 2009/0030197 A1 | 1/2009 | Chew et al. | |
| 2009/0047278 A1 | 2/2009 | Owa et al. | |
| 2009/0143353 A1 | 6/2009 | Kawakami et al. | |
| 2015/0011546 A1 | 1/2015 | Albrecht et al. | |
| 2015/0051163 A1 | 2/2015 | Keilhack et al. | |
| 2015/0065503 A1 | 3/2015 | Kuntz et al. | |
| 2015/0126522 A1 | 5/2015 | Burgess et al. | |
| 2015/0361067 A1 | 12/2015 | Collins et al. | |
| 2016/0159782 A1 | 6/2016 | Yu et al. | |
| 2016/0222047 A1 | 8/2016 | Zhong et al. | |
| 2017/0073335 A1 | 3/2017 | Kanno et al. | |
| 2017/0334891 A1 | 11/2017 | Knight et al. | |
| 2017/0355708 A1 | 12/2017 | Jefson et al. | |
| 2018/0200238 A1 | 7/2018 | Watanabe et al. | |
| 2019/0343816 A1 | 11/2019 | Yamano et al. | |
| 2021/0206776 A1 | 7/2021 | Cote et al. | |
| 2022/0257577 A1 | 8/2022 | Bradley | |
| 2024/0116905 A1 | 4/2024 | Cote et al. | |

FOREIGN PATENT DOCUMENTS

| | | |
|---|---|---|
| BR | PI0704074 A2 | 1/2010 |
| CA | 2100642 A1 | 1/1994 |
| CN | 101851218 A | 10/2010 |
| CN | 102958937 A | 3/2013 |
| CN | 104168890 A | 11/2014 |
| CN | 104968646 A | 10/2015 |
| CN | 105102446 A | 11/2015 |
| CN | 106132954 A | 11/2016 |
| CN | 106727549 A | 5/2017 |
| CN | 108135908 A | 6/2018 |

(Continued)

OTHER PUBLICATIONS

Malwade, C. et al. Process Analytical Technology for Crystallization of Active Pharmaceutical Ingredients. Curr Pharm Des. 2018, 24, 21, 2456-2472 (Year: 2018).*
Maini, L. et al. Crystal Forms of Enzalutamide and a Crystal Engineering Route to Drug Purification. Cryst. Growth Des. Jul. 18, 2018, 3774-3780; (Year: 2018).*
Beno, B. et al. A Survey of the Role of Noncovalent Sulfur Interactions in Drug Design. J. Med. Chem. 2015, 58, 11, 4383-4438 (Year: 2015).*
Khanna, A. et al. Design, Synthesis, and Pharmacological Evaluation of Second Generation EZH2 Inhibitors with Long Residence Time. ACS Med. Chem. Lett. Nov. 6, 2020, 1205-1212 (Year: 2020).*
Beno, B. et al. J. Med. Chem. 2015, 58, 11, 4383-4438 (Year: 2015).*

(Continued)

*Primary Examiner* — Clinton A Brooks
*Assistant Examiner* — Nicola Maria Bauer
(74) *Attorney, Agent, or Firm* — McCarter & English, LLP; Michael J. DeGrazia

(57) ABSTRACT

The present disclosure relates to a crystalline Form 1 of 7-chloro-2-(4-(3-methoxyazetidin-1-yl)cyclohexyl)-2,4-dimethyl-N-((6-methyl-4-(methylthio)-2-oxo-1,2-dihydropyridin-3-yl)methyl)benzo[d][1,3]dioxole-5-carboxamide, which is useful as modulators the activity of histone methyl modifying enzymes. The present disclosure also provides pharmaceutically acceptable compositions comprising the crystalline form and methods of using said compositions in the treatment of various disorders.

15 Claims, 7 Drawing Sheets

(56) References Cited

FOREIGN PATENT DOCUMENTS

| | | |
|---|---|---|
| CN | 108136011 A | 6/2018 |
| CN | 108314677 A | 7/2018 |
| CN | 111989325 A | 11/2020 |
| DE | 10148617 A1 | 4/2003 |
| DE | 10219294 A1 | 11/2003 |
| EP | 372657 A1 | 6/1990 |
| EP | 1384713 A1 | 1/2004 |
| EP | 3121175 A1 | 1/2017 |
| EP | 3329917 A1 | 6/2018 |
| EP | 3929199 A1 | 12/2021 |
| JP | S63-017850 A | 1/1988 |
| JP | H02-255673 A | 10/1990 |
| JP | H02-255674 A | 10/1990 |
| JP | H02-269352 A | 11/1990 |
| JP | H02-282354 A | 11/1990 |
| JP | H03-130280 A | 6/1991 |
| JP | H04-046175 A | 2/1992 |
| JP | H10-287654 A | 10/1998 |
| JP | 2006-145294 A | 6/2006 |
| JP | 2010-254629 A | 11/2010 |
| JP | 2019-168611 A | 10/2019 |
| RU | 2509770 C2 | 3/2014 |
| WO | 1997/26884 A1 | 7/1997 |
| WO | 1997/43273 A1 | 11/1997 |
| WO | 1999/21422 A1 | 5/1999 |
| WO | 2000/018761 A1 | 4/2000 |
| WO | 2002/016327 A1 | 2/2002 |
| WO | 2002/016333 A2 | 2/2002 |
| WO | 2002/016352 A1 | 2/2002 |
| WO | 2002/006229 A3 | 7/2002 |
| WO | 2002/055072 A1 | 7/2002 |
| WO | 2002/074307 A1 | 9/2002 |
| WO | 2002/081443 A1 | 10/2002 |
| WO | 2002/085895 A1 | 10/2002 |
| WO | 2003/029223 A1 | 4/2003 |
| WO | 2003/035635 A1 | 5/2003 |
| WO | 2003/059258 A2 | 7/2003 |
| WO | 2003/062392 A2 | 7/2003 |
| WO | 2003/075858 A2 | 9/2003 |
| WO | 2003/086386 A1 | 10/2003 |
| WO | 2002/016327 | 11/2003 |
| WO | 2003/059898 A3 | 2/2004 |
| WO | 2004/013120 A1 | 2/2004 |
| WO | 2004/022023 A1 | 3/2004 |
| WO | 2004/026274 A1 | 4/2004 |
| WO | 2005/011686 A1 | 2/2005 |
| WO | 2005/030704 A1 | 4/2005 |
| WO | 2005/049008 A1 | 6/2005 |
| WO | 2005/049627 A1 | 6/2005 |
| WO | 2005/100321 A1 | 10/2005 |
| WO | 2005/110410 A2 | 11/2005 |
| WO | 2005/112932 A2 | 12/2005 |
| WO | 2006/003068 A2 | 1/2006 |
| WO | 2006/014136 A1 | 2/2006 |
| WO | 2006/040318 A2 | 4/2006 |
| WO | 2006/046914 A1 | 5/2006 |
| WO | 2006/058648 A2 | 6/2006 |
| WO | 2006/090930 A1 | 8/2006 |
| WO | 2006/096807 A1 | 9/2006 |
| WO | 2006/103449 A2 | 10/2006 |
| WO | 2006/110447 A2 | 10/2006 |
| WO | 2006/125119 A1 | 11/2006 |
| WO | 2006/127205 A2 | 11/2006 |
| WO | 2006/129609 A1 | 12/2006 |
| WO | 2006/130403 A1 | 12/2006 |
| WO | 2007/011820 A2 | 1/2007 |
| WO | 2007/014154 A2 | 2/2007 |
| WO | 2007/019083 A1 | 2/2007 |
| WO | 2007/081630 A2 | 7/2007 |
| WO | 2007/085136 A1 | 8/2007 |
| WO | 2007/107758 A1 | 9/2007 |
| WO | 2007/138037 A1 | 12/2007 |
| WO | 2008/027648 A2 | 3/2008 |
| WO | 2008/029168 A2 | 3/2008 |
| WO | 2008/052256 A1 | 5/2008 |
| WO | 2008/054252 A1 | 5/2008 |
| WO | 2008/141081 A1 | 11/2008 |
| WO | 2009/054914 A1 | 4/2009 |
| WO | 2009/136995 A2 | 11/2009 |
| WO | 2010/008761 A1 | 1/2010 |
| WO | 2010/019772 A2 | 2/2010 |
| WO | 2010/137738 A1 | 12/2010 |
| WO | 2011/004018 A1 | 1/2011 |
| WO | 2011/006653 A1 | 1/2011 |
| WO | 2011/084657 A1 | 7/2011 |
| WO | 2011/091757 A1 | 8/2011 |
| WO | 2011/140324 A1 | 11/2011 |
| WO | 2011/156775 A2 | 12/2011 |
| WO | 2011/159297 A1 | 12/2011 |
| WO | 2012/013725 A1 | 2/2012 |
| WO | 2012/016879 A1 | 2/2012 |
| WO | 2012/036278 A1 | 3/2012 |
| WO | 2012/045196 A1 | 4/2012 |
| WO | 2012/118812 A2 | 9/2012 |
| WO | 2012/126922 A1 | 9/2012 |
| WO | 2012/142504 A1 | 10/2012 |
| WO | 2013/025484 A1 | 2/2013 |
| WO | 2013/025584 A1 | 2/2013 |
| WO | 2013/065835 A1 | 5/2013 |
| WO | 2013/120104 A2 | 8/2013 |
| WO | 2013/142712 A1 | 9/2013 |
| WO | 2014/034898 A1 | 3/2014 |
| WO | 2014/066435 A1 | 5/2014 |
| WO | 2014/124418 A1 | 8/2014 |
| WO | 2014/160401 A1 | 10/2014 |
| WO | 2014/177464 A2 | 11/2014 |
| WO | 2015/034271 A1 | 3/2015 |
| WO | 2015/069110 A1 | 5/2015 |
| WO | 2015/141616 A1 | 9/2015 |
| WO | 2016/038540 A1 | 3/2016 |
| WO | 2016/130396 A1 | 8/2016 |
| WO | 2017/018499 A1 | 2/2017 |
| WO | 2017/040190 A1 | 3/2017 |
| WO | 2017/121648 A1 | 7/2017 |
| WO | 2017/139414 A1 | 8/2017 |
| WO | 2018/013789 A1 | 1/2018 |
| WO | 2018/135556 A1 | 7/2018 |
| WO | 2018/170513 A1 | 9/2018 |
| WO | 2018/218070 A2 | 11/2018 |
| WO | 2019/084271 A1 | 5/2019 |
| WO | 2019/086890 A1 | 5/2019 |
| WO | 2019/124537 A1 | 6/2019 |
| WO | 2019/140322 A1 | 7/2019 |
| WO | 2019/191558 A1 | 10/2019 |
| WO | 2019/204490 A1 | 10/2019 |

OTHER PUBLICATIONS

Khanna, A. et al. ACS Med. Chem. Lett. Nov. 6, 2020, 1205-1212 (Year: 2020).*
Gaikwad et al., The Use of Bioisosterism in Drug Design and Molecular Modification. Am J PharmTech Res. 2012;2(4):1-23.
Hatta et al., Development and future prospect EZH1/2 dual inhibitor for malignant lymphoma. Hematology. Jan. 1, 2018;77(4):457-463.
Kung et al., Design and Synthesis of Pyridone-Containing 3,4-Dihydroisoquinoline-1(2H)-ones as a Novel Class of Zeste Homolog 2 (EZH2) Inhibitors. J Med Chem. Sep. 22, 2016;59(18):8306-25.
Venkatesan et al., Bioisoterism Review—an Biological Modification. World Journal of Pharmacy and Pharmaceutical Sciences. 2017;6(9):1918-49.
Copending U.S. Appl. No. 17/591,149, filed Feb. 2, 2022.
Copending U.S. Appl. No. 17/628,948, filed Jan. 21, 2022.
Liu et al., Polycomb Group Proteins EZH2 and EED Directly Regulate Androgen Receptor in Advanced Prostate Cancer. International Journal of Cancer. 2019;145:415-426.
Scher et al., Increased Survival with Enzalutamide in Prostate Cancer after Chemotherapy. N Engl J Med. 2012;367(13):1187-1197.
Fujita et al., Dual inhibition of EZH1/2 breaks the quiescence of leukemia stem cells in acute myeloid leukemia. Leukemia. Apr. 2018;32(4):855-864.

(56) References Cited

OTHER PUBLICATIONS

Brittain, Polymorphism in Pharmaceutical Solids, Second Edition. informa healthcare, New York. James Swarbrick (Ed.). 654 pages, (2009).
U.S. Appl. No. 16/387,851, filed Apr. 18, 2019, now U.S. Pat. No. 10,689,371, Issued.
U.S. Appl. No. 16/856,454, filed Apr. 23, 2020, now U.S. Pat. No. 11,274,095, Issued.
U.S. Appl. No. 17/951,149, filed Feb. 2, 2022, Abandoned.
U.S. Appl. No. 17/941,276, filed Sep. 9, 2022, Abandoned.
U.S. Appl. No. 18/140,730, filed Apr. 28, 2023, Pending.
U.S. Appl. No. 17/057,225, filed Nov. 20, 2020, 2021-0206776, Published.
U.S. Appl. No. 17/628,948, filed Jan. 21, 2022, 2022-0257577, Published.
U.S. Appl. No. 16/387,851, filed Apr. 18, 2019, now U.S. Pat. No. 10,689,371, Granted.
U.S. Appl. No. 16/856,454, filed Apr. 23, 2020, now U.S. Pat. No. 11,274,095, Granted.
U.S. Appl. No. 17/591,149, filed Feb. 2, 2022, Abandoned.

\* cited by examiner

CRYSTALLINE FORMS OF 7-CHLORO-2-(4-3-METHOXYAZETIDIN-1-YL)CYCLOHEXYL)-2,4-DIMETHYL-N-((6-METHYL-4-(METHYLTHIO)-2-OXO-1,2-DIHYDROPYRIDIN-3-YL) METHYL)BENZO[D][1,3]DIOXOLE-5-CARBOXAMIDE

RELATED APPLICATIONS

This application is a 35 U.S.C. § 371 national stage filing of International Application No. PCT/US2020/043178, filed on Jul. 23, 2020, which claims priority to U.S. Provisional Application No. 62/878,012, filed Jul. 24, 2019, the entire contents of each of which are incorporated herein by reference.

BACKGROUND

Eukaryotic chromatin is composed of macromolecular complexes called nucleosomes. A nucleosome has 147 base pairs of DNA wrapped around a protein octamer having two subunits of each of histone protein H2A, H2B, H3, and H4. Histone proteins are subject to post-translational modifications which in turn affect chromatin structure and gene expression. One type of post-translational modification found on histones is methylation of lysine and arginine residues. Histone methylation plays a critical role in the regulation of gene expression in eukaryotes. Methylation affects chromatin structure and has been linked to both activation and repression of transcription (Zhang and Reinberg, Genes Dev. 15:2343-2360, 2001). Enzymes that catalyze attachment and removal of methyl groups from histones are implicated in gene silencing, embryonic development, cell proliferation, and other processes.

One class of histone methylases is characterized by the presence of a Suppressor of Variegation Enhancer of Zeste Trithorax (SET) domain, comprising about 130 amino acids. Enhancer of Zeste Homolog 2 (EZH2) is an example of a human SET-domain containing methylase. EZH2 associates with EED (Embryonic Ectoderm Development) and SUZ12 (suppressor of zeste 12 homolog) to form a complex known as PRC2 (Polycomb GroupRepressive Complex 2) having the ability to tri-methylate histone H3 at lysine 27 (Cao and Zhang, Mol. Cell 15:57-67, 2004). PRC2 complexes can also include RBAP46 and RBAP48 subunits. Another example is the related methylase EZH1.

The oncogenic activities of EZH2 have been shown by a number of studies. In cell line experiments, over-expression of EZH2 induces cell invasion, growth in soft agar, and motility while knockdown of EZH2 inhibits cell proliferation and cell invasion (Kleer et al., 2003, Proc. Nat. Acad. Sci. USA 100:11606-11611; Varambally et al., (2002), "The polycomb group protein EZH2 is involved in progression of prostate cancer," Nature 419, 624-629). It has been shown that EZH2 represses the expression of several tumor suppressors, including E-cadherin, DAB2IP and RUNX3 among others. In xenograft models, EZH2 knockdown inhibits tumor growth and metastasis. Recently, it has been shown that down modulation of EZH2 in murine models blocks prostate cancer metastasis (Min et al., "An oncogene-tumor suppressor cascade drives metastatic prostate cancer by coordinately activating Ras and nuclear factor-kappaB," Nat Med. 2010 March; 16(3):286-94). EZH2 overexpression is associated with aggressiveness of certain cancers such as breast cancer (Kleer et al., Proc. Nat. Acad. Sci. USA 100:11606-11611, 2003). Recent studies also suggest that prostate cancer specific oncogenic fusion gene TMPRSS2-ERG induces repressive epigenetic programs via direct activation of EZH2 (Yu et al., "An Integrated Network of Androgen Receptor, Polycomb, and TMPRSS2-ERG Gene Fusions in Prostate Cancer Progression," Cancer Cell. 2010 May 18; 17(5):443-454).

Compound 1, 7-chloro-2-(4-(3-methoxyazetidin-1-yl)cyclohexyl)-2,4-dimethyl-N-((6-methyl-4-(methylthio)-2-oxo-1,2-dihydropyridin-3-yl)methyl)benzo[d][1,3]dioxole-5-carboxamide is a small molecule inhibitor of EZH2 showing great therapeutic potential for treating a variety of conditions associated with a methyl modifying enzyme, e.g., in treating proliferative disorders such as cancer. Compound 1 is exemplified in U.S. Provisional Application No. 62/659,408, the contents of which is incorporated herein by reference, and has the structure:

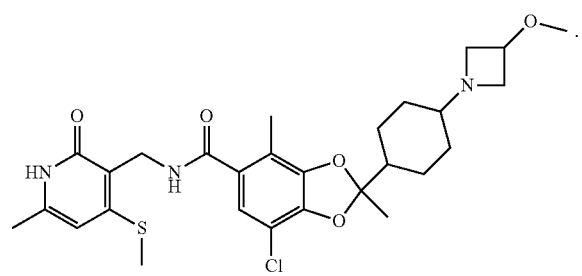

The development of alternative forms of Compound 1 represents an attractive area to further the treatment of diseases or disorders responsive to inhibition of EZH2.

SUMMARY

Provided herein are crystalline forms of Compound 1.

Also provided herein are pharmaceutical compositions comprising one or more of the disclosed crystalline forms of Compound 1.

Further provided is the use of one or more of the disclosed crystalline forms of Compound 1 in the treatment of diseases or disorders responsive to inhibition of EZH2, e.g., cancer.

DETAILED DESCRIPTION

Definitions

Figure 1:
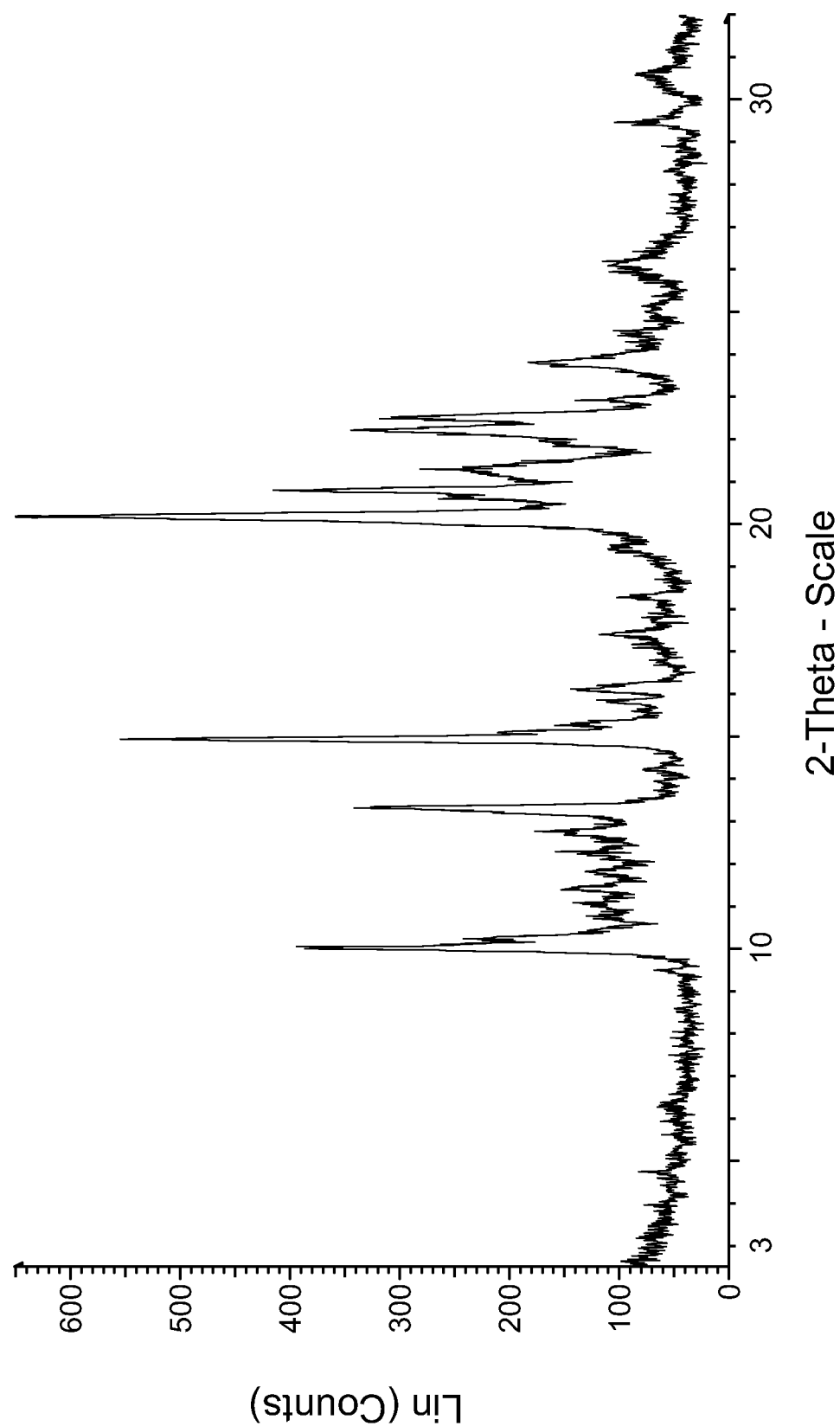
FIG. 1 depicts an X-ray powder diffraction pattern (XRPD) for crystalline Form 1 of Compound 1.

As used herein, "crystalline" refers to a solid form of a compound wherein there exists long-range atomic order in the positions of the atoms. The crystalline nature of a solid can be confirmed, for example, by examination of the X-ray powder diffraction pattern.

Unless otherwise specified, the crystalline forms (Form 1, Form 2, and Form 3) of Compound 1 are each single crystalline forms. A "single crystalline form" means that the recited compound, i.e., Compound 1, is present as a single crystal or a plurality of crystals in which each crystal has the same crystal form (e.g., Form 1, 2 or 3). Percent by weight of a particular crystal form is determined by the weight of the particular crystal form divided by the sum weight of the particular crystal, plus the weight of the other crystal forms present plus the weight of amorphous form present multiplied by 100%.

"Form 1", "crystalline Form 1", or "single crystalline Form 1" are used interchangeably. "Form 2", "crystalline Form 2", or "single crystalline Form 2" are used interchangeably. "Form 3", "crystalline Form 3", or "single crystalline Form 3" are used interchangeably.

Chemical purity refers to extent by which the disclosed form is free from materials having different chemical structures. Chemical purity of the compound in the disclosed crystal forms means the weight of the compound divided by the sum of the weight of the compound plus materials/impurities having different chemical structures multiplied by 100%, i.e., percent by weight.

The term "amorphous" refers to a solid that is present in a non-crystalline state or form. Amorphous solids are disordered arrangements of molecules and therefore possess no distinguishable crystal lattice or unit cell and consequently have no definable long range ordering. Solid state ordering of solids may be determined by standard techniques known in the art, e.g., by X-ray powder diffraction (XRPD) or differential scanning calorimetry (DSC).

The term "anhydrous" and "anhydrate" are used interchangeably and mean that the referenced crystalline form has substantially no water in the crystal lattice, e.g., less than 1% by weight as determined by Karl Fisher analysis The 2-theta values of the X-ray powder diffraction patterns for the crystalline forms described herein may vary slightly from one instrument to another and also depending on variations in sample preparation and batch to batch variation due to factors such as temperature variation, sample displacement, and the presence or absence of an internal standard. Therefore, unless otherwise defined, the XRPD patterns/assignments recited herein are not to be construed as absolute and can vary ±0.2 degrees. It is well known in the art that this variability will account for the above factors without hindering the unequivocal identification of a crystal form. Unless otherwise specified, the 2-theta values provided herein were obtained using Cu Kα1 radiation.

Temperature values, e.g., for DSC peaks herein may vary slightly from one instrument to another and also depending on variations in sample preparation, batch to batch variation, and environmental factors. Therefore, unless otherwise defined, temperature values recited herein are not to be construed as absolute and can vary ±5 degrees or ±2 degrees.

"Substantially the same XRPD pattern" or "an X-ray powder diffraction pattern substantially similar to" a defined figure means that for comparison purposes, at least 90% of the peaks shown are present. It is to be further understood that for comparison purposes some variability in peak intensities from those shown are allowed, such as ±0.2 degrees.

The amount of one crystalline form relative to another crystalline form in a sample can be assessed by preparing a series of mixtures of the two crystalline forms with known weight ratios and obtaining an XRPD spectrum for each. For example, the relative amounts of crystalline Form 1 and Form 2 in a sample can be assessed by selecting one or more characteristic peaks of crystalline Form 1 and Form 2 depicted in FIG. 1 and FIG. 3, respectively, and correlating their relative intensities in the sample XRPD to their relative intensities in the mixture XRPDs.

As used herein the terms "subject" and "patient" may be used interchangeably, and means a mammal in need of treatment, e.g., companion animals (e.g., dogs, cats, and the like), farm animals (e.g., cows, pigs, horses, sheep, goats and the like) and laboratory animals (e.g., rats, mice, guinea pigs and the like). Typically, the subject is a human in need of treatment.

The term "pharmaceutically acceptable carrier" refers to a non-toxic carrier, adjuvant, or vehicle that does not adversely affect the pharmacological activity of the compound with which it is formulated, and which is also safe for human use. Pharmaceutically acceptable carriers, adjuvants or vehicles that may be used in the compositions of this disclosure include, but are not limited to, ion exchangers, alumina, aluminum stearate, magnesium stearate, lecithin, serum proteins, such as human serum albumin, buffer substances such as phosphates, glycine, sorbic acid, potassium sorbate, partial glyceride mixtures of saturated vegetable fatty acids, water, salts or electrolytes, such as protamine sulfate, disodium hydrogen phosphate, dicalcium phosphate, potassium hydrogen phosphate, sodium chloride, zinc salts, colloidal silica, magnesium trisilicate, polyvinyl pyrrolidone, polyvinylpyrrolidone-vinyl acetate, cellulose-based substances (e.g., microcrystalline cellulose, hydroxypropyl methylcellulose, hydroxypropyl methylcellulose acetate succinate, hydroxypropyl methylcellulose Phthalate), starch, lactose monohydrate, mannitol, sodium lauryl sulfate, and crosscarmellose sodium, polyethylene glycol, sodium carboxymethylcellulose, polyacrylates, polymethacrylate, waxes, polyethylene-polyoxypropylene-block polymers, polyethylene glycol and wool fat.

The terms "treatment," "treat," and "treating" refer to reversing, alleviating, reducing the likelihood of developing, or inhibiting the progress of a disease or disorder, or one or more symptoms thereof, as described herein. In some embodiments, treatment may be administered after one or more symptoms have developed, i.e., therapeutic treatment. In other embodiments, treatment may be administered in the absence of symptoms. For example, treatment may be administered to a susceptible individual prior to the onset of symptoms (e.g., in light of a history of symptoms and/or in light of genetic or other susceptibility factors), i.e., prophylactic treatment. Treatment may also be continued after symptoms have resolved, for example to prevent or delay their recurrence.

The term "effective amount" or "therapeutically effective amount" includes an amount of a compound described herein that will elicit a biological or medical response of a subject, e.g., a dosage of between 0.001-100 mg/kg body weight/day of Compound 1.

Exemplary Forms

In a first aspect, provided herein is a crystalline Form 1 of a compound having the structural formula:

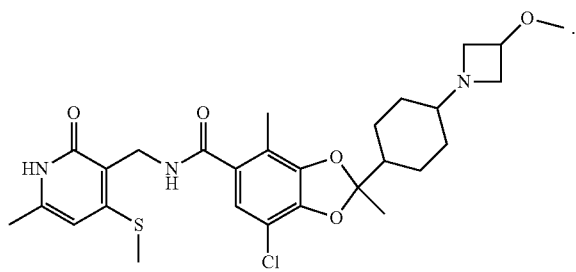

In a second aspect, crystalline Form 1 is characterized by at least three X-ray powder diffraction peaks at 2Θ angles selected from 10.0°, 13.3°, 14.9°, 20.20, 20.80, 22.20, and 22.5°. Alternatively, as part of a second aspect, crystalline Form 1 is characterized by at least four X-ray powder diffraction peaks at 2Θ angles selected from 10.0°, 13.3°, 14.9°, 20.2°, 20.8°, 22.2°, and 22.5°. In another alternative, as part of a second aspect, crystalline Form 1 is characterized by at least five X-ray powder diffraction peaks at 2Θ angles selected from 10.0°, 13.3°, 14.9°, 20.2°, 20.8°, 22.2°, and 22.5°. In another alternative, as part of a second aspect, crystalline Form 1 is characterized by at least six X-ray powder diffraction peaks at 2Θ angles selected from 10.0°, 13.3°, 14.9°, 20.2°, 20.8°, 22.2°, and 22.5°. In another alternative, as part of a second aspect, crystalline Form 1 is characterized by X-ray powder diffraction peaks at 2Θ angles selected from 10.0°, 13.3°, 14.9°, 20.2°, 20.8°, 22.2°, and 22.5°. In another alternative, as part of a second aspect, crystalline Form 1 is characterized by X-ray powder diffraction peaks at 2Θ angles selected from 10.0°, 10.2°, 12.3°, 12.7°, 13.3°, 14.9°, 15.3°, 20.2°, 20.8°, 21.3°, 22.2°, 22.5°, and 23.8°. In another alternative, as part of a second aspect, crystalline Form 1 is characterized by X-ray powder diffraction peaks at 2Θ angles selected from 10.0°, 10.2°, 11.0°, 11.4°, 11.8°, 12.3°, 12.7°, 13.3°, 14.9°, 15.3°, 16.1°, 17.4°, 20.2°, 20.8°, 21.3°, 22.2°, 22.5°, and 23.8°. In another alternative, as part of a second aspect, crystalline Form 1 is characterized by x-ray powder diffraction peaks at 2Θ angles selected from 14.9°, 20.2°, and 20.8°. In another alternative, as part of a second aspect, crystalline Form 1 is characterized by x-ray powder diffraction peaks at 2Θ angles selected from 10.0°, 14.9°, 20.2°, and 20.8°. In another alternative, as part of a second aspect, crystalline Form 1 is characterized by x-ray powder diffraction peaks at 2Θ angles selected from 10.0°, 14.9°, 20.2°, 20.8°, and 22.2°. In another alternative, as part of a second aspect, crystalline Form 1 is characterized by x-ray powder diffraction peaks at 2Θ angles selected from 10.0°, 13.3°, 14.9°, 20.2°, 20.8°, and 22.2°. In another alternative, as part of a second aspect, crystalline Form 1 is characterized by an XRPD (x-ray powder diffraction) substantially similar to FIG. 1.

In a third aspect, crystalline Form 1 is characterized by a Differential Scanning Calorimetry (DSC) with a sharp endotherm at 179.5° C. (onset temperature), or Thermogravimetric analysis (TGA) of a 1.0% weight loss between 36 and 179° C., or both, wherein the crystalline Form 1 may also comprise XRPD peaks at 2Θ angles selected from any of those described in the second aspect. In other aspects, crystalline Form 1 is characterized by a Differential Scanning Calorimetry (DSC) substantially similar to FIG. 2, wherein the crystalline Form 1 may also comprise XRPD peaks at 2Θ angles selected from any of those described in the second aspect.

In a fourth aspect, crystalline Form 1 is anhydrous, wherein the crystalline Form 1 may also comprise XRPD peaks at 2Θ angles selected from any of those described in the second aspect, and/or the TGA or DSC values or figures recited in the third aspect.

In a fifth aspect, crystalline Form 1 as described herein (e.g., as in the first, second, third, or fourth aspects) is at least 60% a single crystalline form, at least 70% a single crystalline form, at least 80% a single crystalline form, at least 90% a single crystalline form, at least 95% a single crystalline form, or at least 99% a single crystalline form by weight.

In a sixth aspect, crystalline Form 1 as described herein (e.g., as in the first, second, third, fourth, or fifth aspect) has a chemical purity of at least 60%, at least 70%, at least 80%, at least 90%, at least 95%, or at least 99% by weight.

In a seventh aspect, provided is crystalline Form 2 of a compound having the structural formula:

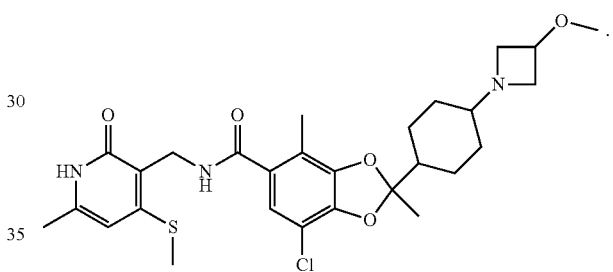

Figure 3:
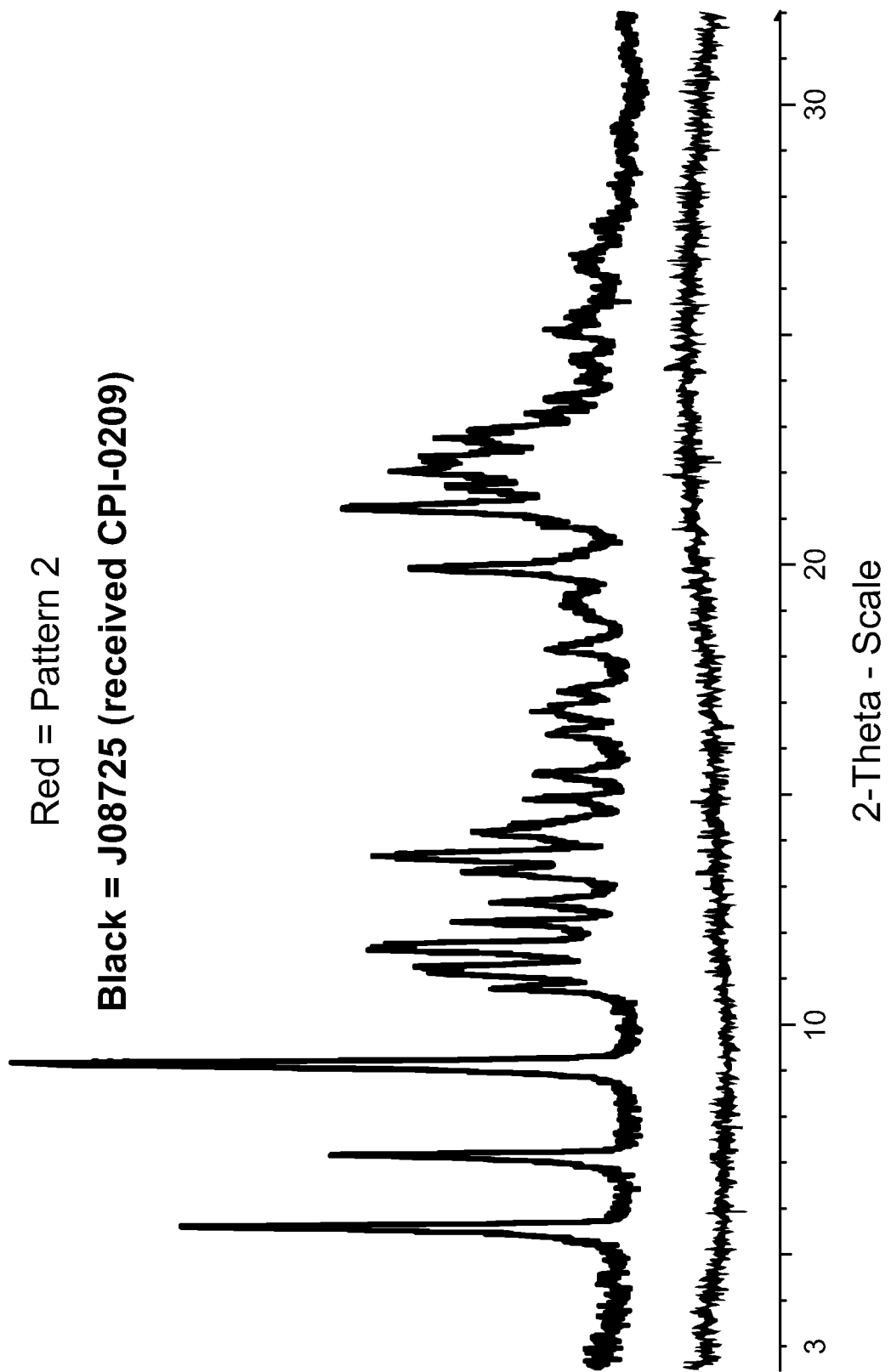
FIG. 3 depicts an X-ray powder diffraction pattern (XRPD) for crystalline Form 2 of Compound 1.

In an eighth aspect, crystalline Form 2 is characterized by an XRPD (x-ray powder diffraction) substantially similar to FIG. 3.

In an ninth aspect, crystalline Form 2 is characterized by a Thermogravimetric analysis (TGA) of a 3.48% weight loss between 46 and 114° C. as well as a 0.97% weight loss between 114 and 156° C., or Differential Scanning Calorimetry (DSC) with two endotherms at 34.2° C. and 122.6° C. (onset temperatures), or both, wherein the crystalline Form 2 may also comprise XRPD peaks at 2Θ angles substantially similar to FIG. 3. Alternatively, as part of a ninth aspect, crystalline Form 2 is characterized by a Thermogravimetric analysis (TGA) or Differential Scanning Calorimetry (DSC) substantially similar to FIG. 4, wherein the crystalline Form 2 may also comprise XRPD peaks at 2Θ angles substantially similar to FIG. 3.

In a tenth aspect, crystalline Form 2 as described herein (e.g., as in the seventh eighth, or ninth aspect) is at least 60% a single crystalline form, at least 70% a single crystalline form, at least 80% a single crystalline form, at least 90% a single crystalline form, at least 95% a single crystalline form, or at least 99% a single crystalline form by weight.

In an eleventh aspect, crystalline Form 2 as described herein (e.g., as in the seventh, eighth, ninth, or tenth aspect) has a chemical purity of at least 60%, at least 70%, at least 80%, at least 90%, at least 95%, or at least 99% by weight.

In an twelfth aspect, provided is crystalline Form 3 of a compound having the structural formula:

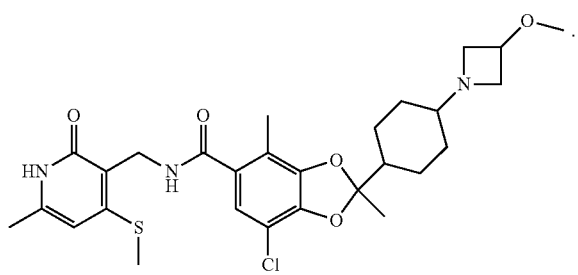

Figure 5:
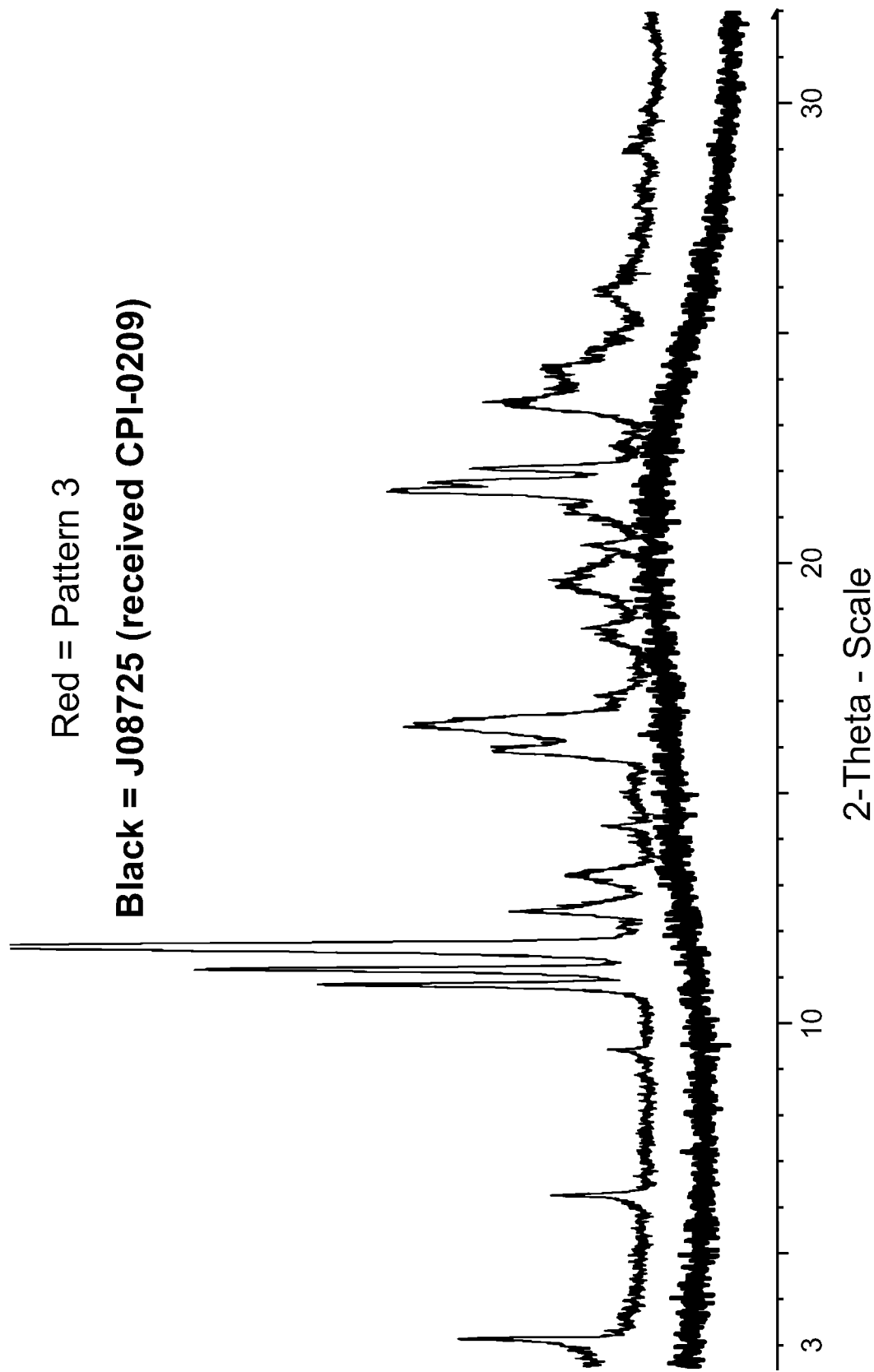
FIG. 5 depicts an X-ray powder diffraction pattern (XRPD) for crystalline Form 3 of Compound 1.

In a thirteenth aspect, crystalline Form 3 is characterized by an XRPD (x-ray powder diffraction) substantially similar to FIG. 5.

Figure 6:
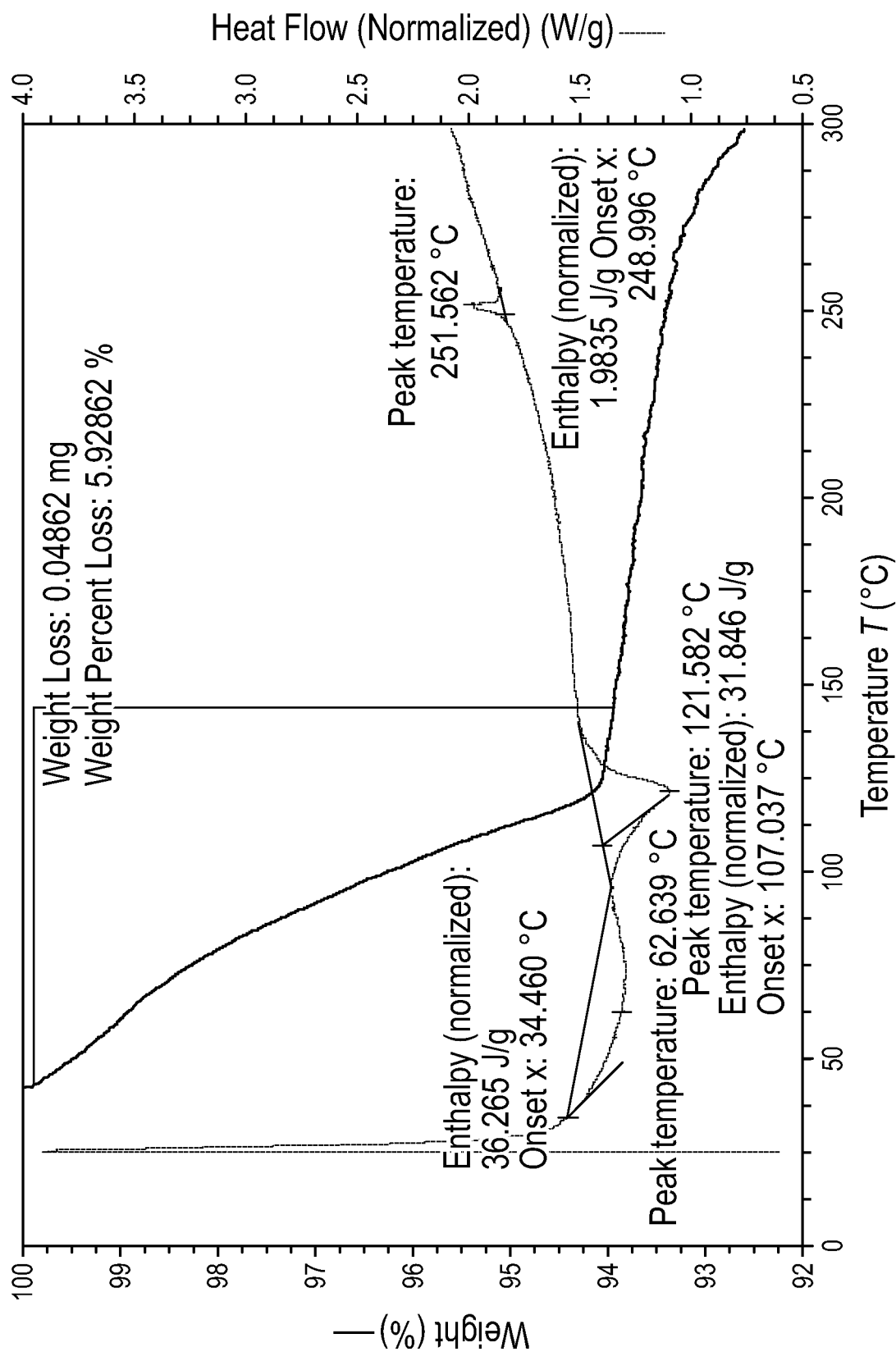
FIG. 6 depicts the combined thermogravimetric analysis (TGA) thermogram and differential scanning calorimetry (DSC) thermogram for Form 3 of Compound 1.

In a fourteenth aspect, crystalline Form 3 is characterized by a Thermogravimetric analysis (TGA) of a 5.93% weight loss between 43 and 143° C., or Differential Scanning Calorimetry (DSC) with two endotherms at 34.5° C. and 107.0° C. (onset temperatures) and one exotherm at 249.0° C. (onset temperature), or both, wherein the crystalline Form 3 may also comprise XRPD peaks at 2Θ angles substantially similar to FIG. 5. Alternatively, as part of a fourteenth aspect, crystalline Form 3 is characterized by a Thermogravimetric analysis (TGA) or Differential Scanning Calorimetry (DSC) substantially similar to FIG. 6, wherein the crystalline Form 3 may also comprise XRPD peaks at 2Θ angles substantially similar to FIG. 5.

In a fifteenth aspect, crystalline Form 3 as described herein (e.g., as in the twelfth thirteenth, or fourteenth aspect) is at least 60% a single crystalline form, at least 70% a single crystalline form, at least 80% a single crystalline form, at least 90% a single crystalline form, at least 95% a single crystalline form, or at least 99% a single crystalline form by weight.

In a sixteenth aspect, crystalline Form 3 as described herein (e.g., as in the twelfth, thirteenth, fourteenth, or fifteenth aspects) has a chemical purity of at least 60%, at least 70%, at least 80%, at least 90%, at least 95%, or at least 99% by weight.

In a seventeenth aspect, the crystalline Form 1 as described herein (e.g., as in the first, second, third, fourth, or fifth aspect), the crystalline Form 2 as described herein (e.g., as in the seventh, eighth, ninth, tenth, or eleventh aspect), the or crystalline Form 3 (e.g., as in the twelfth, thirteenth, fourteenth, fifteenth, or sixteenth aspect) is represented by the following structural formula:

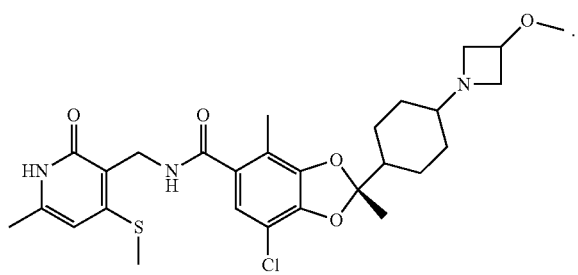

Alternatively, as part of a seventeenth aspect, the crystalline Form 1 as described herein (e.g., as in the first, second, third, fourth, or fifth aspect), the crystalline Form 2 as described herein (e.g., as in the seventh, eighth, ninth, tenth, or eleventh aspect), the or crystalline Form 3 (e.g., as in the twelfth, thirteenth, fourteenth, fifteenth, or sixteenth aspect) is represented by the following structural formula:

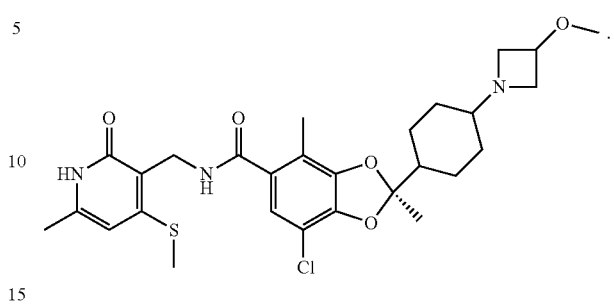

Alternatively, as part of a seventeenth aspect, the crystalline Form 1 as described herein (e.g., as in the first, second, third, fourth, or fifth aspect), the crystalline Form 2 as described herein (e.g., as in the seventh, eighth, ninth, tenth, or eleventh aspect), the or crystalline Form 3 (e.g., as in the twelfth, thirteenth, fourteenth, fifteenth, or sixteenth aspect) is represented by the following structural formula:

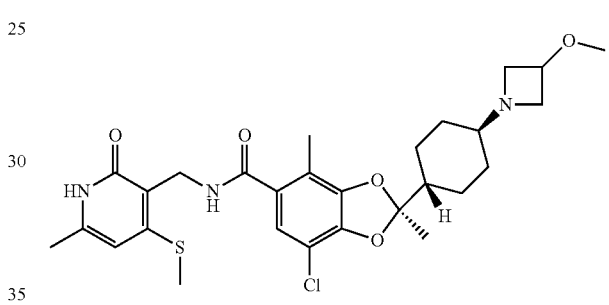

having the chemical name (2R)-7-chloro-2-(trans-4-(3-methoxyazetidin-1-yl)cyclohexyl)-2,4-dimethyl-N-((6-methyl-4-(methylthio)-2-oxo-1,2-dihydropyridin-3-yl)methyl)benzo[d][1,3]dioxole-5-carboxamide.

Uses, Formulation and Administration

The crystalline forms described herein and compositions thereof are useful for treating diseases or disorders responsive to inhibition of EZH2. Such diseases and disorders include those associated with cellular proliferation. In some embodiments, the crystalline forms and compositions thereof described herein are useful in treating diseases and/or disorders associated with misregulation of cell cycle or DNA repair. In some embodiments, the crystalline forms and compositions thereof described herein are useful in treating cancer. Exemplary types of cancer include e.g., adrenal cancer, acinic cell carcinoma, acoustic neuroma, acral lentiginous melanoma, acrospiroma, acute eosinophilic leukemia, acute erythroid leukemia, acute lymphoblastic leukemia, acute megakaryoblastic leukemia, acute monocytic leukemia, acute promyelocytic leukemia, adenocarcinoma, adenoid cystic carcinoma, adenoma, adenomatoid odontogenic tumor, adenosquamous carcinoma, adipose tissue neoplasm, adrenocortical carcinoma, adult T-cell leukemia/lymphoma, aggressive NK-cell leukemia, AIDS-related lymphoma, alveolar rhabdomyosarcoma, alveolar soft part sarcoma, ameloblastic fibroma, anaplastic large cell lymphoma, anaplastic thyroid cancer, angioimmunoblastic T-cell lymphoma, angiomyolipoma, angiosarcoma, astrocytoma, atypical teratoid rhabdoid tumor, B-cell chronic lymphocytic leukemia, B-cell prolymphocytic leukemia, B-cell lymphoma, basal cell carcinoma, biliary tract cancer, bladder cancer, blastoma, bone cancer, Brenner tumor, Brown tumor, Burkitt's lymphoma, breast cancer, brain cancer, carcinoma, carcinoma in situ, carcinosarcoma, cartilage tumor, cementoma, myeloid sarcoma, chondroma, chordoma, choriocarcinoma, choroid plexus papilloma, clear-cell sarcoma of the kidney, craniopharyngioma, cutaneous T-cell lymphoma, cervical cancer, colorectal cancer, Degos disease, desmoplastic small round cell tumor, diffuse large B-cell lymphoma, dysembryoplastic neuroepithelial tumor, dysgerminoma, embryonal carcinoma, endocrine gland neoplasm, endodermal sinus tumor, enteropathy-associated T-cell lymphoma, esophageal cancer, fetus in fetu, fibroma, fibrosarcoma, follicular lymphoma, follicular thyroid cancer, ganglioneuroma, gastrointestinal cancer, germ cell tumor, gestational choriocarcinoma, giant cell fibroblastoma, giant cell tumor of the bone, glial tumor, glioblastoma multiforme, glioma, gliomatosis cerebri, glucagonoma, gonadoblastoma, granulosa cell tumor, gynandroblastoma, gallbladder cancer, gastric cancer, hairy cell leukemia, hemangioblastoma, head and neck cancer, hemangiopericytoma, hematological malignancy, hepatoblastoma, hepatosplenic T-cell lymphoma, Hodgkin's lymphoma, non-Hodgkin's lymphoma, invasive lobular carcinoma, intestinal cancer, kidney cancer, laryngeal cancer, lentigo maligna, lethal midline carcinoma, leukemia, leydig cell tumor, liposarcoma, lung cancer, lymphangioma, lymphangiosarcoma, lymphoepithelioma, lymphoma, acute lymphocytic leukemia, acute myelogenous leukemia, chronic lymphocytic leukemia, liver cancer, small cell lung cancer, non-small cell lung cancer, MALT lymphoma, malignant fibrous histiocytoma, malignant peripheral nerve sheath tumor, malignant triton tumor, mantle cell lymphoma, marginal zone B-cell lymphoma, mast cell leukemia, mediastinal germ cell tumor, medullary carcinoma of the breast, medullary thyroid cancer, medulloblastoma, melanoma, meningioma, merkel cell cancer, mesothelioma, metastatic urothelial carcinoma, mixed Mullerian tumor, mucinous tumor, multiple myeloma, muscle tissue neoplasm, mycosis fungoides, myxoid liposarcoma, myxoma, myxosarcoma, nasopharyngeal carcinoma, neurinoma, neuroblastoma, neurofibroma, neuroma, nodular melanoma, ocular cancer, oligoastrocytoma, oligodendroglioma, oncocytoma, optic nerve sheath meningioma, optic nerve tumor, oral cancer, osteosarcoma, ovarian cancer, Pancoast tumor, papillary thyroid cancer, paraganglioma, pinealoblastoma, pineocytoma, pituicytoma, pituitary adenoma, pituitary tumor, plasmacytoma, polyembryoma, precursor T-lymphoblastic lymphoma, primary central nervous system lymphoma, primary effusion lymphoma, primary peritoneal cancer, prostate cancer, pancreatic cancer, pharyngeal cancer, pseudomyxoma peritonei, renal cell carcinoma, renal medullary carcinoma, retinoblastoma, rhabdomyoma, rhabdomyosarcoma, Richter's transformation, rectal cancer, sarcoma, Schwannomatosis, seminoma, Sertoli cell tumor, sex cord-gonadal stromal tumor, signet ring cell carcinoma, skin cancer, small blue round cell tumors, small cell carcinoma, soft tissue sarcoma, somatostatinoma, soot wart, spinal tumor, splenic marginal zone lymphoma, squamous cell carcinoma, synovial sarcoma, Sezary's disease, small intestine cancer, squamous carcinoma, stomach cancer, T-cell lymphoma, testicular cancer, thecoma, thyroid cancer, transitional cell carcinoma, throat cancer, urachal cancer, urogenital cancer, urothelial carcinoma, uveal melanoma, uterine cancer, verrucous carcinoma, visual pathway glioma, vulvar cancer, vaginal cancer, Waldenstrom's macroglobulinemia, Warthin's tumor, and Wilms' tumor.

In one aspect, the cancer treated by the crystalline forms and compositions thereof described herein is selected from breast cancer, prostate cancer, colon cancer, renal cell carcinoma, glioblastoma multiforme cancer, bladder cancer, melanoma, bronchial cancer, lymphoma, liver cancer, multiple myeloma, lymphoma, ovarian cancer, NSCL, pancreatic cancers, malignant rhabdoid tumor, synovial sarcoma, and glioma.

Another aspect of the present disclosure is the use of one or more of the crystalline forms as described herein in the manufacture of a medicament for use in the treatment of a disorder or disease herein. Another object of the present disclosure is one or more of the crystalline forms or composition described herein for use in the treatment of a disorder or disease herein.

Also provided are pharmaceutical compositions comprising one or more of the disclosed crystalline forms; and a pharmaceutically acceptable carrier.

Compositions described herein may be administered orally, parenterally, by inhalation spray, topically, rectally, nasally, buccally, vaginally or via an implanted reservoir. The term "parenteral" as used herein includes subcutaneous, intravenous, intramuscular, intra-articular, intra-synovial, intrasternal, intrathecal, intrahepatic, intralesional and intracranial injection or infusion techniques.

The amount of provided crystalline form that may be combined with carrier materials to produce a composition in a single dosage form will vary depending upon the patient to be treated and the particular mode of administration. Provided compositions may be formulated such that a dosage of between 0.001-100 mg/kg body weight/day of the inhibitor can be administered to a patient receiving these compositions.

It should also be understood that a specific dosage and treatment regimen for any particular patient will depend upon a variety of factors, including age, body weight, general health, sex, diet, time of administration, rate of excretion, drug combination, the judgment of the treating physician, and the severity of the particular disease being treated. The amount of a provided crystalline form in the composition will also depend upon the particular compound in the composition.

EXEMPLIFICATION

As depicted in the Examples below, crystalline forms were prepared according to the following general procedures.

Preparation of Amorphous Compound 1

Figure 7:
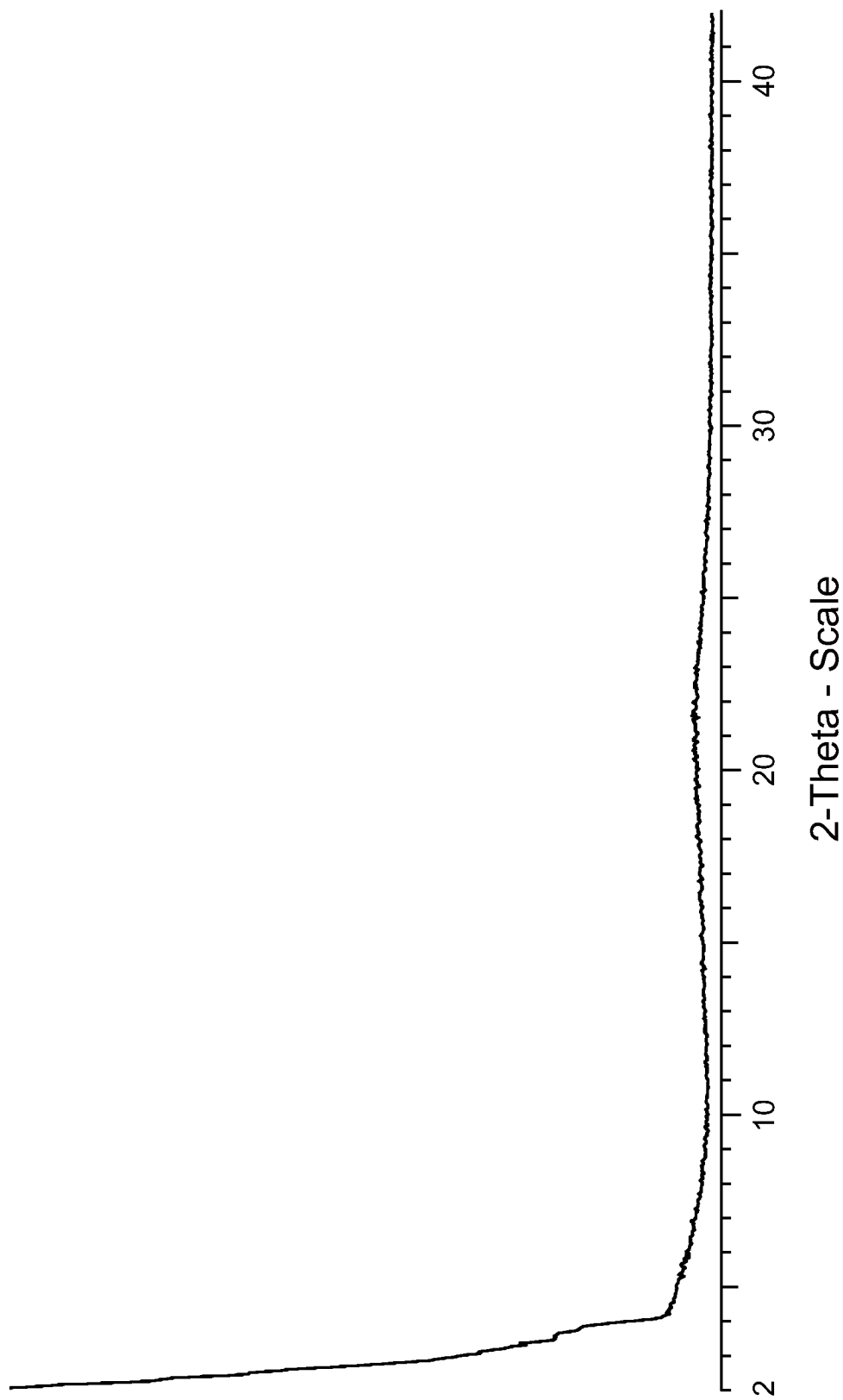
FIG. 7 depicts an X-ray powder diffraction pattern (XRPD) for the amorphous Form of Compound 1 as prepared from the procedures set forth in Example 17 of U.S. Provisional Application No. 62/659,408.

The amorphous form of Compound 1 was prepared as a single enantiomer, single geometric isomer, using the following procedure below. The XRPD pattern of the amorphous product from this procedure is shown in FIG. 7.

Intermediate 1: methyl 7-chloro-2,4-dimethyl-2-(4-oxocyclohexyl)benzo[d][1,3]dioxole-5-carboxylate

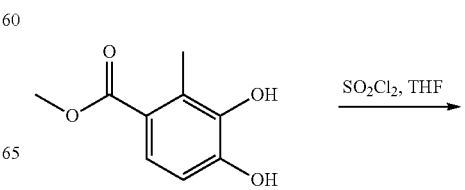

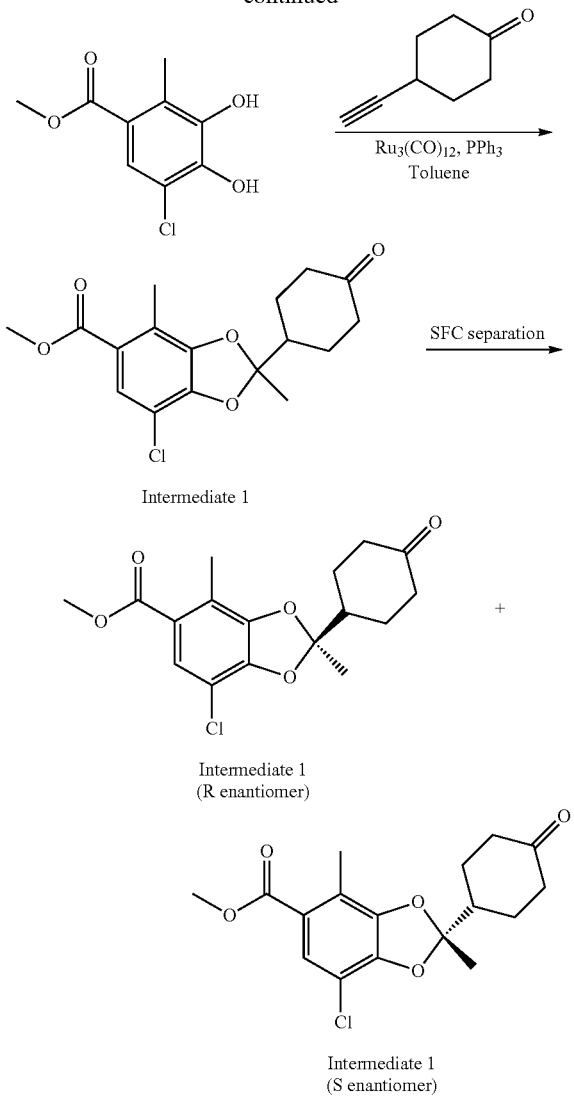

Intermediate 1

Intermediate 1
(R enantiomer)

Intermediate 1
(S enantiomer)

Step 1: Synthesis of Methyl 5-Chloro-3,4-Dihydroxy-2-Methylbenzoate

To a solution of methyl 3,4-dihydroxy-2-methylbenzoate (5.11 g, 27.9 mmol) in tetrahydrofuran (199 mL) at −20° C. was added sulfuryl chloride (2.45 mL, 30.6 mmol) dropwise. The reaction mixture was stirred at −20° C. for 3 h then quenched with a saturated aqueous solution of ammonium chloride (50 mL). The desired product was extracted with ethyl acetate (25 mL×3). The combined organic layers were washed with brine (25 mL), dried over sodium sulfate, filtered, and concentrated to dryness under reduced pressure. The residue was purified by flash chromatography (silica gel, gradient 0% to 60% ethyl acetate in heptane) to give the title compound (4.117 g, 68% yield) as a beige solid. LCMS [M+H]$^+$ m/z: calc'd 217.0; found 217.1 (Cl isotope pattern).

Step 2: Synthesis of methyl 7-chloro-2,4-dimethyl-2-(4-oxocyclohexyl)-2H-1,3-benzodioxole-5-carboxylate A mixture of methyl 5-chloro-3,4-dihydroxy-2-methylbenzoate (1.2 g, 5.53 mmol), triruthenium dodecacarbonyl (176 mg, 276 μmol), and triphenylphosphine (145 mg, 553 μmol) was degassed under vacuum and purged with nitrogen (3 cycles). Toluene (8.1 mL) was added and the reaction mixture was heated to reflux for 30 min. A solution of 4-ethynylcyclohexan-1-one (1.34 g, 11.0 mmol) in toluene (17 mL) was then added dropwise and the reaction stirred for 23 h at reflux. Finally, the reaction mixture was cooled to room temperature and concentrated to dryness under reduced pressure. The residue was purified by flash chromatography (silica gel, gradient 0 to 60% ethyl acetate in heptane) to give the title compound (1.327 g, 70% yield) as a yellow oil. LCMS [M+Na]$^+$ m/z: calc'd 361.1; found 361.1 (Cl isotope pattern).

Step 3: Separation of methyl (R)-7-chloro-2,4-dimethyl-2-(4-oxocyclohexyl)benzo[d][1,3]dioxole-5-carboxylate and methyl (S)-7-chloro-2,4-dimethyl-2-(4-oxocyclohexyl)benzo[d][1,3]dioxole-5-carboxylate The racemic mixture of methyl-7-chloro-2,4-dimethyl-2-(4-oxocyclohexyl)benzo[d][1,3]dioxole-5-carboxylate (4.4 g, 13 mmol) was resolved by preparative SFC [Column: ChiralPak AY from Daicel chemical industries (250 mm×50 mm I.D., 10 μm). Mobile phase A: CO$_2$/Mobile phase B: 0.1% NH$_4$OH in methanol. Isocratic (85% mobile phase A and 15% mobile phase B). Flow rate: 80 mL/min. Column temperature: 40° C.]. Intermediate 1 (Peak 1) (undesired enantiomer/distomer): Retention time=6.2 min. Recovery=1.4 g, 4.05 mmol, 31% yield, 90% ee, 98% purity (yellow solid). $^1$H NMR (400 MHz, Chloroform-d) δ 7.48 (s, 1H), 3.78 (s, 3H), 2.44-2.36 (m, 2H), 2.35-2.25 (m, 6H), 2.19 (tdd, J=2.8, 5.6, 13.1 Hz, 2H), 1.70-1.57 (m, 5H). Intermediate 1 (Peak 2) (desired enantiomer/eutomer): Retention time=7.0 min. Recovery=1.1 g, 3.08 mmol, 23.75% yield, 99% ee, 95% purity (yellow solid). $^1$H NMR (400 MHz, Chloroform-d) δ 7.49 (s, 1H), 3.78 (s, 3H), 2.44-2.36 (m, 2H), 2.36-2.25 (m, 6H), 2.20 (tdd, J=2.8, 5.6, 13.1 Hz, 2H), 1.72-1.59 (m, 5H). SFC analytical method: [Column: ChiralPak AY-3 (150×4.6 mm I.D., 3 μm). Mobile phase A: CO$_2$/Mobile phase B: 0.05% Et$_2$NH in iPrOH. Gradient: from 5 to 40% of mobile phase B (over 5.5 min). Flow rate: 2.5 mL/min. Column temperature: 40° C.]. Intermediate 1 (Peak 1—undesired enantiomer/distomer): Retention time=2.853 min. Intermediate 1 (Peak 2—desired enantiomer/eutomer): Retention time=2.979 min.

Intermediate 2: 7-chloro-2-(4-(3-methoxyazetidin-1-yl)cyclohexyl)-2,4-dimethylbenzo[d][1,3]dioxole-5-carboxylic acid

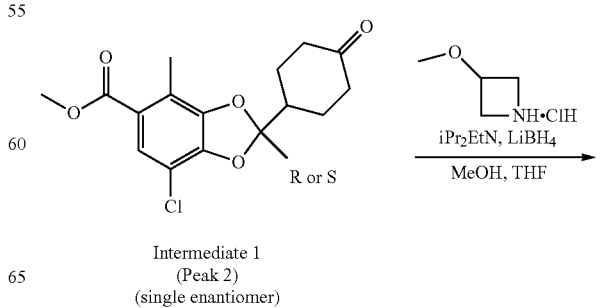

Intermediate 1
(Peak 2)
(single enantiomer)

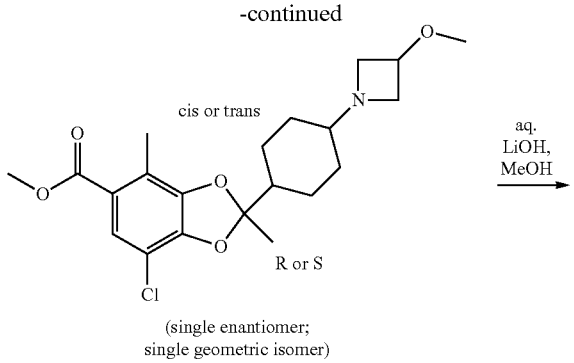

(single enantiomer; single geometric isomer)

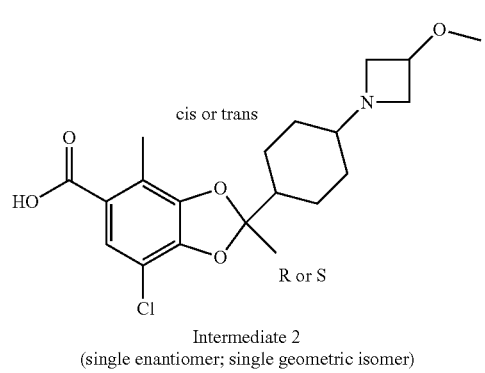

Intermediate 2
(single enantiomer; single geometric isomer)

Step 1: Synthesis of methyl 7-chloro-2-(4-(3-methoxyazetidin-1-yl)cyclohexyl)-2,4-dimethyl-benzo[d][1,3]dioxole-5-carboxylate A solution of 3-methoxyazetidine hydrochloride salt (8 g, 64.75 mmol) and N,N-diisopropylethylamine (12 mL, 68.9 mmol) in methanol (30 mL) was stirred at room temperature for 30 min before a solution of another solution of methyl 7-chloro-2,4-dimethyl-2-(4-oxocyclohexyl)-1,3-benzodioxole-5-carboxylate (Intermediate 1-Peak 2) (4.1 g, 12.10 mmol) in tetrahydrofuran (30 mL) was added. The reaction mixture was stirred at room temperature for 1 h then cooled to −70° C. Lithium borohydride (500 mg, 22.96 mmol) was added and the reaction stirred at −70° C. for 30 min [or until complete consumption of the starting material was observed by TLC, ethyl acetate/methanol 5:1]. Next, two batches of the reaction were combined and quenched with a saturated aqueous solution of ammonium chloride (120 mL) at 0° C. and the desired product was extracted with dichloromethane (200 mL×3). The combined organic layers were dried over sodium sulfate, filtered and concentrated to dryness under reduced pressure. The residue was purified by flash chromatography (silica gel, gradient 0 to 14% methanol in dichloromethane) to give title compound (8.05 g, 67% yield, 83% purity) as a light yellow oil. A sample (50 mg) was purified further by preparative thin layer chromatography (silica gel, ethyl acetate:methanol 15:1). LCMS [M+H]$^+$ m/z: calc'd. 410.2; found 410.1. $^1$H NMR (400 MHz, Methanol-d$_4$) δ 7.39 (s, 1H), 3.95-3.91 (m, 1H), 3.73 (s, 3H), 3.59-3.51 (m, 2H), 3.16 (s, 3H), 2.97 (br dd, J=6.4, 8.0 Hz, 2H), 2.26 (s, 3H), 2.11-2.02 (m, 1H), 1.91-1.73 (m, 5H), 1.54 (s, 3H), 1.22-1.12 (m, 2H), 0.98-0.86 (m, 2H).

Step 2: Synthesis of 7-chloro-2-(4-(3-methoxyazetidin-1-yl)cyclohexyl)-2,4-dimethylbenzo[d][1,3]dioxole-5-carboxylic acid To a solution of methyl 7-chloro-2-(4-(3-methoxyazetidin-1-yl)cyclohexyl)-2,4-dimethylbenzo[d][1,3]dioxole-5-carboxylate (4 g, 9.75 mmol) in methanol (48 mL) was added a solution of lithium hydroxide hydrate (4.03 g, 96.06 mmol) in water (12 mL). The reaction was stirred at 70° C. for 2 h then two batches were combined and concentrated under reduced pressure. Water (50 mL) was added and the pH adjusted to 6 with a saturated aqueous citric acid solution at 0° C. The desired product was extracted with a 3:1 mixture of dichloromethane and isopropanol (300 mL×5). The combined organic layers were dried over sodium sulfate, filtered and concentrated to dryness under reduced pressure to give the title compound (6.1 g, crude) as a off-white solid, which was used in the next step without further purification. LCMS [M+H]$^+$ m/z: calc'd. 396.2; found 396.1. $^1$H NMR (400 MHz, Methanol-d$_4$) δ 7.07 (s, 1H), 4.05-4.10 (m, 2H), 3.76-3.88 (m, 1H), 3.67 (br dd, J=10, 3.6 Hz, 2H), 3.22 (s, 3H), 2.71-2.81 (m, 1H), 2.19 (s, 3H), 1.91-1.99 (m, 4H), 1.75-1.85 (m, 1H), 1.52 (s, 3H), 1.18-1.28 (m, 2H), 1.06-1.14 (m, 2H).

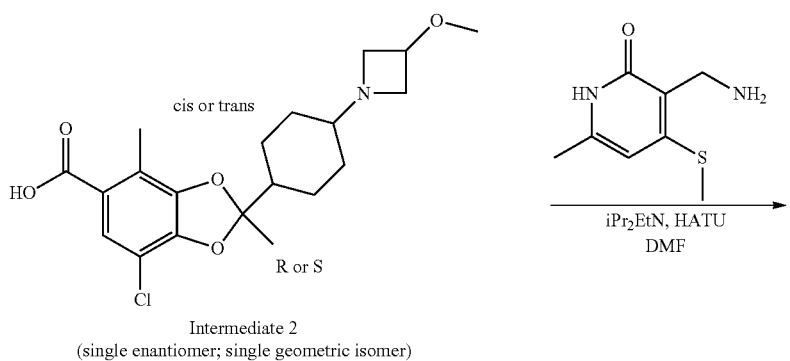

Intermediate 2
(single enantiomer; single geometric isomer)

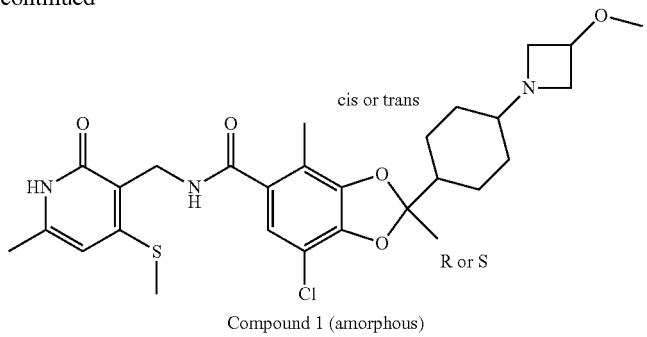

Compound 1 (amorphous)
(single enantiomer; single geometric isomer)

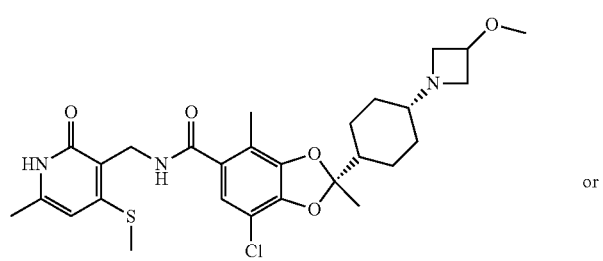

(S)-7-chloro-2-((1r,4S)-4-(3-methoxyazetidin-1-yl)cyclohexyl)-2,4-dimethyl-N-((6-methyl-4-(methylthio)-2-oxo-1,2-dihydropyridin-3-yl)methyl)benzo[d][1,3]dioxole-5-carboxamide or (S)-7-chloro-2-((1s,4R)-4-(3-methoxyazetidin-1-yl)cyclohexyl)-2,4-dimethyl-N-((6-methyl-4-(methylthio)-2-oxo-1,2-dihydropyridin-3-yl)methyl)benzo[d][1,3]dioxole-5-carboxamide

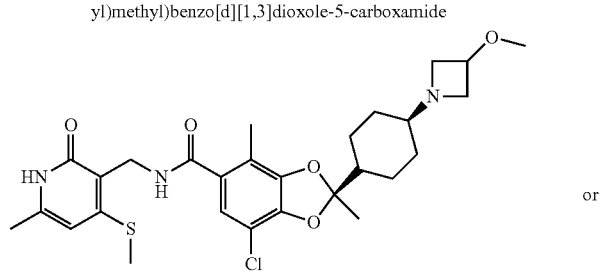

(R)-7-chloro-2-((1r,4R)-4-(3-methoxyazetidin-1-yl)cyclohexyl)-2,4-dimethyl-N-((6-methyl-4-(methylthio)-2-oxo-1,2-dihydropyridin-3-yl)methyl)benzo[d][1,3]dioxole-5-carboxamide or (R)-7-chloro-2-((1s,4S)-4-(3-methoxyazetidin-1-yl)cyclohexyl)-2,4-dimethyl-N-((6-methyl-4-(methylthio)-2-oxo-1,2-dihydropyridin-3-yl)methyl)benzo[d][1,3]dioxole-5-carboxamide To a solution of 7-chloro-2-(4-(3-methoxyazetidin-1-yl)cyclohexyl)-2,4-dimethylbenzo[d][1,3]dioxole-5-carboxylic acid (Intermediate 2-single enantiomer and geometric isomer) (5 g, 12.63 mmol) in N,N-dimethylformamide (50 mL) were added O-(7-azabenzotriazol-1-yl)-N,N,N',N'-tetramethyluronium hexafluorophosphate (5.7 g, 14.99 mmol) and N,N-diisopropylethylamine (11 mL, 63.15 mmol). The mixture was stirred at 20° C. for 30 min before 3-(aminomethyl)-6-methyl-4-(methylthio)pyridin-2(1H)-one hydrochloride salt (Intermediate 1) (4.2 g, 19.03 mmol) was added. The reaction mixture was stirred at room temperature for an additional 1.5 h then filtered. The filtrate was purified by preparative HPLC [Column: Phenomenex Gemini C18 (250 mm×50 mm, 10 μm). Mobile phase A: water (0.04% ammonia hydroxide v/v and 10 mM ammonium bicarbonate)/Mobile phase B: acetonitrile. Gradient (75 to 44% mobile phase A/25 to 56% mobile phase B, over 23 min). Column temperature: 30° C.] to give the title compound (4.4 g, 60% yield, 96% purity as a white solid. LCMS [M+H]$^+$ m/z: calc'd. 562.2; found 562.2. $^1$H NMR (400 MHz, Methanol-d$_4$) δ 6.91 (s, 1H), 6.29 (s, 1H), 4.50 (s, 2H), 4.01 (quin, J=6 Hz, 1H), 3.58 (dd, J=8.8, 6.4 Hz, 2H), 3.26 (s, 3H), 2.92-3.02 (m, 2H), 2.54 (s, 3H), 2.31 (s, 3H), 2.21 (s, 3H), 2.01-2.11 (m, 1H), 1.79-2.00 (m, 5H), 1.62 (s, 3H), 1.19-1.34 (m, 2H), 0.91-1.08 (m, 2H). The XRPD pattern of the amorphous product from this procedure is shown in FIG. 7.

LIST OF ABBREVIATIONS

| Acronym | Meaning |
| --- | --- |
| % w/w | Percentage weight |
| $^1$H-NMR | Proton Nuclear magnetic Resonance |
| DMF | dimethyl formamide |
| DMSO | dimethylsulfoxide |

-continued

| Acronym | Meaning |
|---|---|
| DSC | Differential Scanning Calorimetry |
| DVS | Dynamic Vapour Sorption |
| EtOAc | ethyl acetate |
| EtOH | ethanol |
| GVS | Gravimetric Vapour Sorption |
| $H_2O$ | water |
| HPLC | High Performance Liquid Chromatography |
| HCl | Hydrochloric acid |
| IC | Ion Chromatography |
| IPA | propan-2-ol |
| KF | Karl Fischer |
| MAS | Magic Angle Spinning |
| MDSC | Modulated Differential Scanning Calorimetry |
| MEK | methyl ethyl ketone |
| MeOH | methanol |
| N/A | Not Applicable |
| PLM | Polarised Light Microscopy |
| RH | Relative Humidity |
| RT | Room Temperature |
| SCXRD | Single Crystal X-Ray Diffraction |
| SEM | Scanning Electron Microscope |
| TFA | tri-fluoro acetic acid |
| Tg | Glass transition |
| TGA | Thermal Gravimetric Analysis |
| THF | tetrahydrofuran |
| UV | UltraViolet |
| VT-XRPD | Variable Temperature X-Ray Powder Diffraction |
| XRPD | X-Ray Powder Diffraction |

1. Instrument and Methodology Details

X-Ray Powder Diffraction (XRPD):

XRPD diffractograms were collected on a Bruker AXS C2 GADDS, Bruker AXS D8 Advance, or PANalytical Empyrean as detailed below.

Bruker AXS C2 GADDS

XRPD using the Bruker AXS C2 GADDS diffractometer was performed using Cu Kα radiation (40 kV, 40 mA), an automated XYZ stage, a laser video microscope for auto-sample positioning and a Våntec-500 2-dimensional area detector. X-ray optics consisted of a single Gabel multilayer mirror coupled with a pinhole collimator of 0.3 mm. The beam divergence, i.e. the effective size of the X-ray beam on the sample, was approximately 4 mm. A θ-θ continuous scan mode was employed with a sample—detector distance of 20 cm which gives an effective 2θ range of 1.5°-32.5°. Typically, the sample was exposed to the X-ray beam for 120 seconds. The software used for data collection and analysis was GADDS for Win7/XP and Diffrac Plus EVA, respectively. Samples run under ambient conditions were prepared as flat plate specimens using powder as received without grinding. Samples were prepared and analyzed on either a glass slide or glass frit. Samples were lightly pressed onto a glass slide to obtain a flat surface for analysis. A glass frit filter block was used to isolate and analyze solids from suspensions by adding a small amount of suspension directly to the glass frit before filtration under a light vacuum. For variable temperature (VT) experiments samples were mounted on an Anton Paar DHS 900 hot stage under ambient conditions. The sample was then heated to the appropriate temperature at 10° C./min and subsequently held isothermally for 1 minute before data collection was initiated. Samples were prepared and analyzed on a silicon wafer mounted to the hot stage using a heat-conducting compound.

Bruker AXS D8 Advance

XRPD using the Bruker D8 diffractometer was performed using Cu Kα radiation (40 kV, 40 mA) and a θ-2θ goniometer fitted with a Ge monochromator. The incident beam passes through a 2.0 mm divergence slit followed by a 0.2 mm anti-scatter slit and knife edge. The diffracted beam passes through an 8.0 mm receiving slit with 2.5° Soller slits followed by the Lynxeye Detector. The software used for data collection and analysis was Diffrac Plus XRD Commander and Diffrac Plus EVA, respectively. Samples were run under ambient conditions as flat plate specimens using powder as received. The sample was prepared on a polished, zero-background (510) silicon wafer by gently pressing onto the flat surface or packed into a cut cavity. The sample was rotated in its own plane.

PANalytical Empyrean

XRPD using the PANalytical Empyrean diffractometer was performed using Cu Kα radiation (45 kV, 40 mA) in transmission geometry. A 0.5° slit, 4 mm mask and 0.04 rad Soller slits with a focusing mirror were used on the incident beam. A PIXcel3D detector, placed on the diffracted beam, was fitted with a receiving slit and 0.04 rad Soller slits. The software used for data collection was X'Pert Data Collector using X'Pert Operator Interface. The data were analyzed and presented using Diffrac Plus EVA or HighScore Plus. Samples were prepared and analyzed in either a metal or Millipore 96 well-plate in transmission mode. X-ray transparent film was used between the metal sheets on the metal well-plate and powders (approximately 1-2 mg) were used as received. The Millipore plate was used to isolate and analyze solids from suspensions by adding a small amount of suspension directly to the plate before filtration under a light vacuum.

Differential Scanning Calorimetry (DSC):

DSC data were collected on a TA Instruments Q2000 equipped with a 50 position auto-sampler. Typically, 0.5-3 mg of each sample, in a pin-holed aluminium pan, was heated at 10° C./min from 25° C. up to 300° C. A purge of dry nitrogen at 50 ml/min was maintained over the sample. Modulated temperature DSC was carried out using an underlying heating rate of 2° C./min and temperature modulation parameters of ±0.318° C. (amplitude) every 60 seconds (period). The instrument control software was Advantage for Q Series and Thermal Advantage and the data were analyzed using Universal Analysis or TRIOS.

DSC data were also collected on a TA Instruments Discovery DSC equipped with a 50 position auto-sampler. Typically, 0.5-3 mg of each sample, in a pin-holed aluminium pan, was heated at 10° C./min from 25° C. up to 300° C. A purge of dry nitrogen at 50 ml/min was maintained over the sample. The instrument control software was TRIOS and the data were analyzed using TRIOS or Universal Analysis.

Thermogravimetric Analysis (TGA)

TGA data were collected on a TA Instruments Q500 TGA, equipped with a 16 position auto-sampler. Typically, 5-10 mg of each sample was loaded onto a pre-tared aluminum DSC pan and heated at 10° C./min from ambient temperature to 300° C. A nitrogen purge at 60 ml/min was maintained over the sample. The instrument control software was Advantage for Q Series and Thermal Advantage and the data were analyzed using Universal Analysis or TRIOS.

TGA data were also collected on a TA Instruments Discovery TGA, equipped with a 25 position auto-sampler. Typically, 5-10 mg of each sample was loaded onto a pre-tared aluminium DSC pan and heated at 10° C./min from ambient temperature to 300° C. A nitrogen purge at 25 ml/min was maintained over the sample. The instrument control software was TRIOS and the data were analyzed using TRIOS or Universal Analysis.

2. General Crystallization Methods

Screening methods for crystallization are outlined in methods described below.

Maturation/Slurry Ripening

In Maturation Chamber: Suspensions for maturation were placed in a platform shaker incubator (Heidolph Titramax/Incubator 1000, FIG. 2) and subjected to a series of heat-cool cycles from ambient to approximately 50° C. This was achieved by switching the heating on or off every 4 hours. Shaking was maintained throughout.

In Polar Bear: Suspensions were stirred (500 rpm) in a Polar Bear (Cambridge Reactor Design) for varying lengths of time at 50° C. The samples were then cooled to 25° C. at 0.1° C./min and stirred for a further four hours. After this time the samples were heated back to 50° C. at 0.1° C./min. The cycle was then repeated.

Cooling Crystallization

Solutions were cooled to 5° C. at 0.1° C./min in a Polar Bear and stirred at this temperature for varying lengths of time. All solids were filtered and dried under suction for 10 min and initially analyzed by XRPD. The solutions were further cooled to −20° C. for 16 h and any new solids were then treated as previously. Any remaining solutions were evaporated (see Method 3 below).

Controlled Evaporation

Solutions placed in vials were evaporated at ambient conditions by removing the lids of the vials or by inserting a needle into the septum cap of the vials. The samples were allowed to slowly evaporate to dryness or until a solid appeared at ambient conditions.

Precipitation/Crystallization by Anti-Solvent Addition

Solutions were treated with anti-solvent dropwise at 50° C. until it became cloudy. The samples were then cooled to 5° C. at 0.1° C./min and held isothermally. Where required, additional anti-solvent was added to the suspensions. The solids were filtered and dried under suction for 10 min and the residues were initially analyzed by XRPD.

3. Screening Methods

The amorphous form of Compound 1 samples with different purities, one with 95.2% purity (30 mg) and another with 97.6% purity (20 mg), were each suspended or dissolved in 10-30 vol of a given solvent at RT. After 5 min equilibration at RT, all samples (solutions and suspensions) were heated to 50° C. for 10 minutes and the resulting samples were treated as follows: Suspensions were matured between 60 and 5° C. for 72 hrs (4 hrs at each temperature). Solutions were cooled from 50 to 5° C. at 0.1° C./min and maintained at 5° C. for 72 hrs. If no solid was obtained, the solutions were allowed to evaporate at RT. All the recovered solids were analyzed by XRPD and subsequently by the appropriate techniques. See Tables 1-3 for screening procedures and analytical results.

Based on the XRPD analysis, the polymorph screening using the amorphous form of Compound 1 with 95.2% purity yielded three crystalline forms, denoted herein as Form 1, Form 2, and Form 3 (Tables 1 and 2). Form 1 was the most abundant form, which was obtained from multiple solvent systems. Form 3 was only observed once from the solvent 2-butanol. The polymorph screening using the amorphous form of Compound 1 with 97.6% purity yielded Form 1 and Form 2, but not Form 3 (Table 3). Form 1 was more abundant than Form 2. The characterizations of Forms 1-3 are presented below.

TABLE 1

Polymorph screening using the amorphous form of Compound 1 with 95.2% purity (30 mg)

| Solvent | 10 vol | 20 vol | 30 vol | Observation at 50° C. | Treatment | Evaporation at RT | XRPD |
|---|---|---|---|---|---|---|---|
| n-Heptane | x | x | x | Suspension | Maturation 60/5° C. | N/P | Form 1 |
| Acetone | ✓ | — | | Solution | Cooling at 5° C. | N/P | Form 1 |
| 2-Propanol | ✓ | — | | Solution | Cooling at 5° C. | Glass/Gum | N/P |
| Ethanol | ✓ | — | | Solution | Cooling at 5° C. | Glass/Gum | N/P |
| Ethyl Acetate | x | — | | Suspension | Maturation 60/5° C. | N/P | Form 2 |
| Isopropyl Acetate | x | ✓x | | Suspension | Maturation 60/5° C. | N/P | Form 1 |
| tert-Butylmethyl Ether | x | ✓x | | Suspension | Maturation 60/5° C. | N/P | Form 1 |
| Methylisobutyl Ketone | x | x | | Suspension | Maturation 60/5° C. | N/P | Form 1 |
| Dimethyl Sulfoxide | ✓ | — | | Solution | Cooling at 5° C. | Solid | Amorphous |
| Anisole | ✓ | — | | Solution | Cooling at 5° C. | Glass/Gum | N/P |
| Methanol | ✓ | — | | Solution | Cooling at 5° C. | Solid | Amorphous |
| Toluene | x | ✓x | ✓x | Suspension | Maturation 60/5° C. | N/P | Form 2 |

Key:
✓ = Clear solution;
✓x = turbid;
x = suspension;
N/P = not performed

TABLE 2

Polymorph screening using the amorphous form of Compound 1 with 95.2% purity (30 mg)

| Solvent | 10 vol | 20 vol | 30 vol | Observation at 50° C. | Treatment | Observation post treatment (72 hrs) | Evaporation at RT | XRPD |
|---|---|---|---|---|---|---|---|---|
| Tetrahydrofuran | ✓ | — | — | Solution | Cooling at 5° C. | Solution | Glass/Gum | N/P |
| Dichloromethane | ✓ | — | — | Solution | Cooling at 5° C. | Solution | Glass/Gum | N/P |
| Acetonitrile | ✓ | — | — | Suspension | Maturation 60/5° C. | Suspension | N/P | Form 1 |
| 10% Water/EtOH | ✓ | — | — | Solution | Cooling at 5° C. | Solution | Glass/Gum | N/P |
| 10% Water/IPA | ✓ | — | — | Solution | Cooling at 5° C. | Solution | Glass/Gum | N/P |
| 10% Water/THF | ✓ | — | — | Solution | Cooling at 5° C. | Solution | Glass/Gum | N/P |
| MEK | x | ✓ | — | Solution | Cooling at 5° C. | Suspension | N/P | Form 2 |
| Water suspension | x | x | x | Gummy | Maturation 60/5° C. | Suspension | N/P | Form 1 |
| 2-Butanol | ✓ | — | — | Solution | Cooling at 5° C. | Suspension | N/P | Form 3 |
| Isobutyl acetate | x | x | ✓x | Thin suspension | Maturation 60/5° C. | Suspension | N/P | Form 1 |
| Cyclohexane | x | x | x | Suspension | Maturation 60/5° C. | Suspension | N/P | Form 1 + two additional peaks |
| 1,4-Dioxane | ✓ | — | — | Solution | Cooling at 5° C. | Solution | Solid | Amorphous |

Key:
✓ = Clear solution;
✓x = turbid;
x = suspension;
N/P = not performed

TABLE 3

Polymorph screening using the amorphous form of Compound 1 with 97.6% purity (20 mg)

| Solvent | 10 vol | 20 vol | 30 vol | Observation at 50° C. | Treatment | Observation post treatment (72 hrs) | Evaporation at RT | XRPD |
|---|---|---|---|---|---|---|---|---|
| n-Heptane | x | x | x | Suspension | Maturation 60/5° C. | Suspension | N/P | Form 1 |
| Acetone | x | ✓x | ✓ | Suspension | Maturation 60/5° C. | Suspension | N/P | Form 1 |
| 2-Propanol | ✓ | — | — | Solution | Cooling at 5° C. | Solution | Glass/ gum | N/P |
| Ethanol | ✓ | — | — | Solution | Cooling at 5° C. | Solution | Glass/ gum | N/P |
| Ethyl Acetate | x | x | x | Suspension | Maturation 60/5° C. | Suspension | N/P | Form 1 |
| Isopropyl Acetate | x | x | x | Suspension | Maturation 60/5° C. | Suspension | N/P | Form 1 |
| tert-Butylmethyl Ether | x | x | x | Suspension | Maturation 60/5° C. | Suspension | N/P | Form 1 |
| MEK | ✓ | — | — | Solution | Cooling at 5° C. | Suspension | N/P | Form 1 |
| Toluene | ✓ | — | — | Solution | Cooling at 5° C. | Solution | Solid | Similar to Form 2 |
| Tetrahydrofuran | ✓ | — | — | Solution | Cooling at 5° C. | Solution | Solid | Similar to Form 2 |

TABLE 3-continued

Polymorph screening using the amorphous form of Compound 1 with 97.6% purity (20 mg)

| Solvent | 10 vol | 20 vol | 30 vol | Observation at 50° C. | Treatment | Observation post treatment (72 hrs) | Evaporation at RT | XRPD |
|---|---|---|---|---|---|---|---|---|
| Acetonitrile | x | x | x | Suspension | Maturation 60/5° C. | Suspension | N/P | Form 1 |
| 10% Water/IPA | — | — | — | Solution | Cooling at 5° C. | Solution | Glass/gum | N/P |

Key:
✓ = Clear solution;
✓x = turbid;
x = suspension;
N/P = not performed

4. Selection of New Crystalline Forms

Forms 1 and 2 were selected for further analysis as XRPD for Form 3 revealed a poorly crystalline phase. For Form 1, the sample obtained from acetone had the highest purity (97.4%) and contained only trace solvent. Scale-up experiments on Form 1 were performed accordingly as described below. For Form 2, the sample obtained from MEK had a higher purity (97.2%) and contained only a small amount of residual MEK. Scale-up experiments on Form 1 were performed accordingly as described below.

Scale-Up of Crystalline Form 1 and Form 2

Scale-up experiments for Form 1 in acetone and Form 2 in MEK were each conducted according to the following procedure. The amorphous form of Compound 1 prepared following the methods in U.S. 62/659,408 (1 g) was weighed into two 20 ml scintillated vials, and dissolved in either a 20 volume (20 ml) of acetone or a 20 volume (20 ml) of MEK at 50° C. with stirring. The solutions were then cooled to 5° C. at 0.1° C./min and kept at this temperature for 20 hours. Both samples formed white suspensions that were filtered and dried in Buchner funnel under vacuum. The solids were left to air dry for an hour before characterization of both patterns using a wide variety of techniques (summarized in Tables 4 and 5 and FIG. 1-4). Yields were also calculated from the solids recovered.

Figure 2:
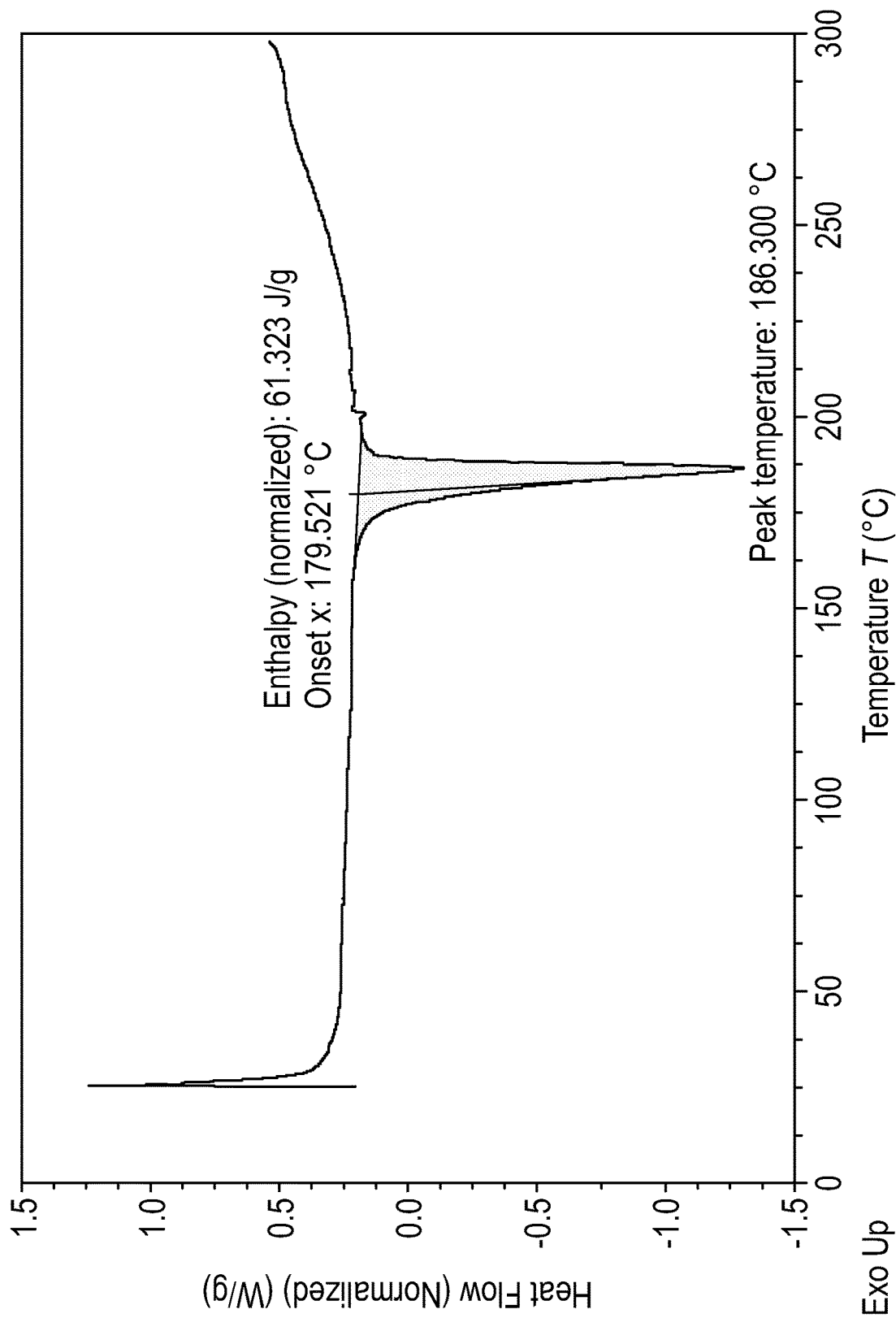
FIG. 2 depicts an exemplary differential scanning calorimetry (DSC) thermogram for Form 1 of Compound 1.

For Form 1 scale-up, the solid sample was confirmed to be crystalline Form 1 by XRPD (Table 4 and FIG. 1). The purity was determined to be 96.6% by HPLC. The sample matched the amorphous form of Compound 1 reference material by $^1$H NMR with a small amount of residual acetone (0.04 eq) remained in the sample. Thermal analysis showed a small weight loss of 1.0% w/w (which equates to 0.32 eq of water), consistent with the KF data. DSC analysis showed a sharp endotherm at 179.5° C. (onset) (FIG. 2). GVS analysis found the material to be slightly hygroscopic, with an uptake of 1.7% w/w water between 0 and 90% RH. The sample remained Form 1 after GVS analysis or stored for 5 days at elevated RH conditions. The morphology of Form 1 by PLM and SEM was agglomerates of small crystalline particles. These agglomerates can vary in size and shape (between 20 and 650 μm), and the crystalline particles are small and irregular (up to 20 μm). Overall, Form 1 was determined to be anhydrous. See also Table 5 for Form 1 property summaries.

Figure 4:
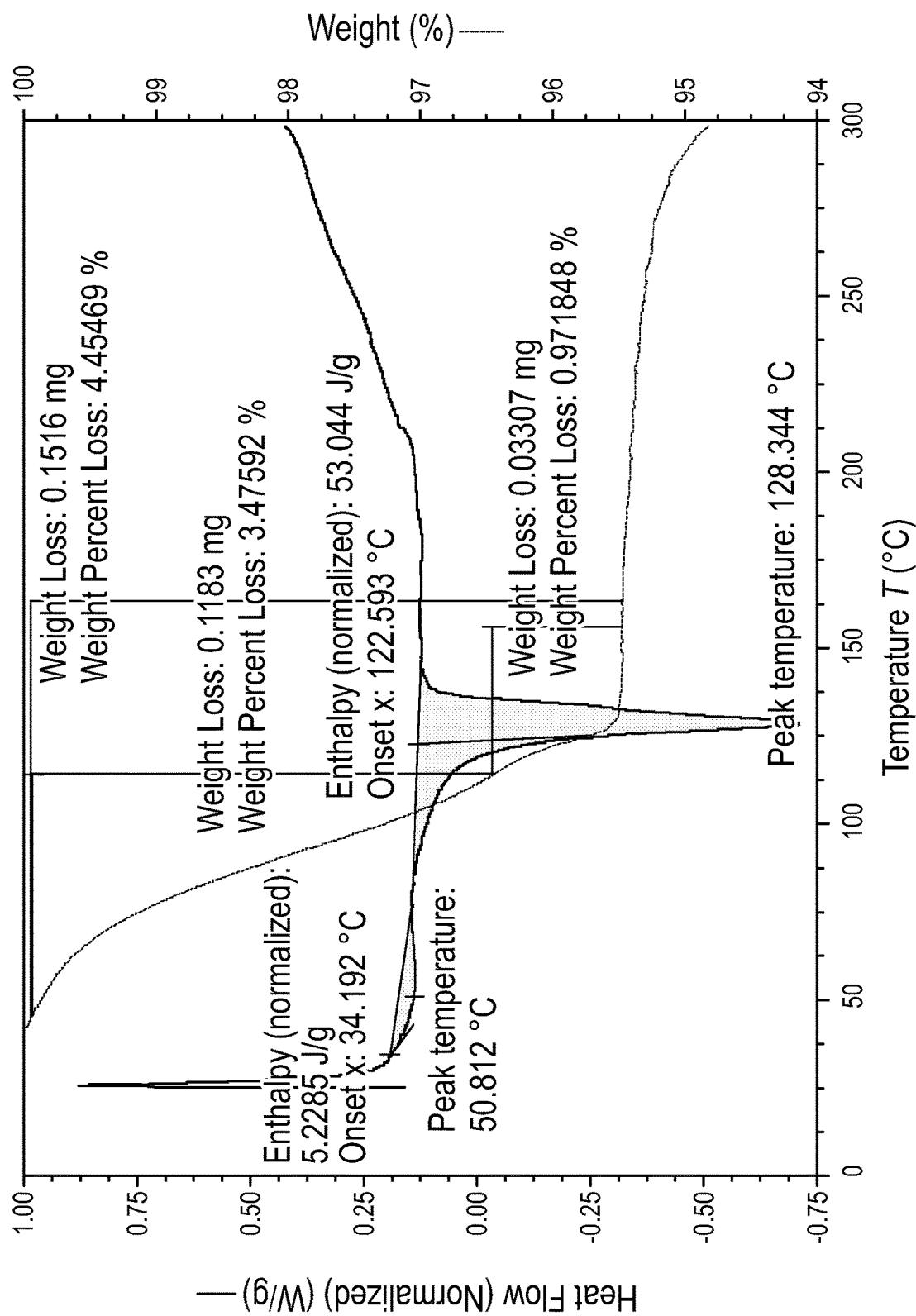
FIG. 4 depicts the combined thermogravimetric analysis (TGA) thermogram and differential scanning calorimetry (DSC) thermogram for Form 2 of Compound 1.

For Form 2 scale-up, the solid sample was confirmed to be crystalline Form 2 by XRPD (FIG. 3). However, further characterizations suggested that Form 2 was a less stable crystalline form than Form 1. For example, unlike Form 1 retaining its original crystalline form, the XRPD analysis showed that Form 2 became amorphous after GVS analysis or stored for 5 days at elevated RH conditions. Unlike Form 1 exhibiting a sharp endotherm (FIG. 2), Form 2 exhibited two endotherm events in the DSC analysis (FIG. 4). Form 2 also exhibited a higher overall weight loss than Form 1 in the TGA analysis. Form 1 was observed more frequently than Form 2 both during polymorph screening and in competitive slurry experiments, further supporting that Form 1 was more stable than Form 2.

TABLE 7

XRPD of crystalline Form 1

| Angle 2-Theta ° | Intensity % |
|---|---|
| 10.0 | 61.1 |
| 10.2 | 37.5 |
| 11.0 | 21.9 |
| 11.4 | 23.9 |
| 11.8 | 20.4 |
| 12.3 | 24.7 |
| 12.7 | 27.6 |
| 13.3 | 52.8 |
| 14.9 | 85.3 |
| 15.3 | 24.8 |
| 16.1 | 22.5 |
| 17.4 | 18.5 |
| 20.2 | 100.0 |
| 20.8 | 63.9 |
| 21.3 | 43.1 |
| 22.2 | 52.9 |
| 22.5 | 49.2 |
| 23.8 | 28.4 |

TABLE 8

Characterization of crystalline Form 1

| Analysis | Scale-up Production of Form 1 |
|---|---|
| XRPD | Crystalline Form 1 (free base) |
| $^1$H-NMR | Consistent with reference material. 0.04 eq of residual acetone |
| HPLC | 96.6% |
| TGA | Weight loss of 1.0% between 36 and 179° C. (equates to 0.32 eq water) |
| DSC | Endotherm at 179.5° C. (onset, 61 J/g). |
| KF | 1.0% w/w (0.32 eq water). |
| GVS | Uptake of ~1.7% w/w water between 0 and 90% RH. No hysteresis. XRPD post GVS showed the material remained Pattern 1. |
| Yield | 54.1% (some material passed through filter. Actual yield should be significantly higher). |

TABLE 8-continued

Characterization of crystalline Form 1

| Analysis | Scale-up Production of Form 1 |
|---|---|
| Static stability 40° C./ 75% RH (5 days) | XRPD: Slight reduction in crystallinity, remained pattern 1 HPLC: 96.5%. |
| Static stability 25° C./ 97% RH (5 days) | XRPD: Slight reduction in crystallinity, remained pattern 1 HPLC: 96.8%. |
| PLM | Agglomerates of small crystalline particles. Agglomerates vary greatly in size and shape between 20 μ and 650 μ in length. Crystalline particles up to 20 μ in length of irregular shape. |
| SEM | Agglomerates of various size comprised of small crystalline irregular shaped particles. |

While have described a number of embodiments of this, it is apparent that our basic examples may be altered to provide other embodiments that utilize the compounds and methods of this disclosure. Therefore, it will be appreciated that the scope of this disclosure is to be defined by the appended claims rather than by the specific embodiments that have been represented by way of example.

The contents of all references (including literature references, issued patents, published patent applications, and co-pending patent applications) cited throughout this application are hereby expressly incorporated herein in their entireties by reference. Unless otherwise defined, all technical and scientific terms used herein are accorded the meaning commonly known to one with ordinary skill in the art.

The invention claimed is:

1. A crystalline Form 1 of a compound having the structural formula:

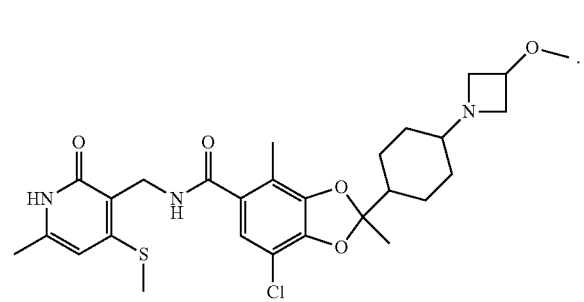

wherein the crystalline form is characterized by at least three x-ray powder diffraction peaks at 2Θ angles selected from 10.0°, 13.3°, 14.9°, 20.2°, 20.8°, 22.2°, and 22.5°.

2. The crystalline Form 1 of claim 1, wherein the crystalline form is characterized by at least four x-ray powder diffraction peaks at 2Θ angles selected from 10.0°, 13.3°, 14.9°, 20.2°, 20.8°, 22.2°, and 22.5°.

3. The crystalline Form 1 of claim 1, wherein the crystalline form is characterized by at least five x-ray powder diffraction peaks at 2Θ angles selected from 10.0°, 13.3°, 14.9°, 20.2°, 20.8°, 22.2°, and 22.5°.

4. The crystalline Form 1 of claim 1, wherein the crystalline form is characterized by at least six x-ray powder diffraction peaks at 2Θ angles selected from 10.0°, 13.3°, 14.9°, 20.2°, 20.8°, 22.2°, and 22.5°.

5. The crystalline Form 1 of claim 1, wherein the crystalline form is characterized by x-ray powder diffraction peaks at 2Θ angles selected from 10.0°, 13.3°, 14.9°, 20.2°, 20.8°, 22.2°, and 22.5°.

6. The crystalline Form 1 of claim 1, wherein the crystalline form is characterized by x-ray powder diffraction peaks at 2Θ angles selected from 14.9°, 20.2°, and 20.8°.

7. The crystalline Form 1 of claim 1, wherein the crystalline form is characterized by x-ray powder diffraction peaks at 2Θ angles selected from 10.0°, 14.9°, 20.2°, and 20.8°.

8. The crystalline Form 1 of claim 1, wherein the crystalline form is characterized by x-ray powder diffraction peaks at 2Θ angles selected from 10.0°, 14.9°, 20.2°, 20.8°, and 22.2°.

9. The crystalline Form 1 of claim 1, wherein the crystalline form is characterized by x-ray powder diffraction peaks at 2Θ angles selected from 10.0°, 13.3°, 14.9°, 20.2°, 20.8°, and 22.2°.

10. The crystalline Form 1 of claim 1, wherein the crystalline form is anhydrous.

11. The crystalline Form 1 of claim 1, wherein the crystalline Form 1 is at least 90% a single crystalline form by weight.

12. The crystalline Form 1 of claim 1, wherein the compound has a chemical purity of at least 90% by weight.

13. The crystalline Form 1 of claim 1, wherein the compound has the structural formula:

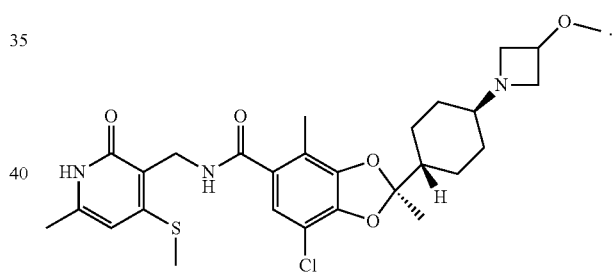

14. A pharmaceutical composition comprising the crystalline form of claim 1, and a pharmaceutically acceptable carrier or diluent.

15. A method of treating cancer in a patient in need thereof, comprising the step of administering to said patient the crystalline form of claim 1, wherein the cancer is selected from breast cancer, prostate cancer, colon cancer, renal cell carcinoma, glioblastoma multiforme cancer, bladder cancer, melanoma, bronchial cancer, lymphoma, liver cancer, multiple myeloma, lymphoma, ovarian cancer, NSCL, pancreatic cancers, malignant rhabdoid tumor, synovial sarcoma, and glioma.

* * * * *